US011336771B2

(12) United States Patent
Bernstein et al.

(10) Patent No.: US 11,336,771 B2
(45) Date of Patent: *May 17, 2022

(54) METHOD AND SYSTEM FOR ACCURATE AUTOMATIC CALL TRACKING AND ANALYSIS

(71) Applicant: Call Compass, LLC, Ardmore, PA (US)

(72) Inventors: Eric F Bernstein, Gladwyne, PA (US); Grant L Aldrich, Thousand Oaks, CA (US); Jasson Gilmore, Aliso Viejo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/242,125

(22) Filed: Jan. 8, 2019

(65) Prior Publication Data
US 2020/0007683 A1 Jan. 2, 2020

Related U.S. Application Data

(60) Continuation of application No. 15/285,373, filed on Oct. 4, 2016, now Pat. No. 10,264,125, which is a
(Continued)

(51) Int. Cl.
H04M 3/00 (2006.01)
H04M 5/00 (2006.01)
(Continued)

(52) U.S. Cl.
CPC .......... *H04M 3/5175* (2013.01); *G06Q 10/02* (2013.01); *G10L 25/48* (2013.01);
(Continued)

(58) Field of Classification Search
CPC ......... G10L 15/00; G10L 15/26; G10L 25/48; G10L 2015/088; G06Q 10/02;
(Continued)

(56) References Cited

U.S. PATENT DOCUMENTS 6,667,962 B1 * 12/2003 Lee ................ H04W 36/16
370/335
6,724,887 B1 * 4/2004 Eilbacher ............ H04M 3/5183
379/265.02
(Continued)

FOREIGN PATENT DOCUMENTS

GB 2395321 A 5/2004

OTHER PUBLICATIONS

Yext, "Yext Brings the Power of Internet Advertising to Every Local Business," originally at http://www.yext.com/company.jsp, available at https://web.archive.org/web/20101204081220/http://www.yext.com/company.jsp.

Primary Examiner — Khai N. Nguyen
(74) Attorney, Agent, or Firm — Finnegan, Henderson, Farabow, Garrett & Dunner, LLP

(57) ABSTRACT

There is disclosed a method in a data processing system for automatically and accurately determining an outcome of a phone call by using signifiers or audibles as a way to increase accuracy without altering the flow of the conversation. The disclosed method can be used in any call center, such as a high volume call center used in the financial (banking), insurance, rental (hotel or car), ticket sales, and the like. The method comprises receiving voice data of a phone call; transmitting a response communication based on the voice data, wherein the response communication includes at least one audible or signifier; identifying, by at least one processor, the at least one audible or signifier in the response communication; and automatically determining the outcome of the phone call based on the audible or signifier in the response communication. A data processing system and a non-transitory computer-readable medium for storing instructions consistent with the described method are also disclosed.

19 Claims, 13 Drawing Sheets

Related U.S. Application Data continuation-in-part of application No. 15/229,444, filed on Aug. 5, 2016, now abandoned, which is a division of application No. 12/750,523, filed on Mar. 30, 2010, now Pat. No. 9,413,877.

(51) Int. Cl.
| | |
|---|---|
| *H04M 3/51* | (2006.01) |
| *G06Q 10/02* | (2012.01) |
| *G10L 25/48* | (2013.01) |
| *G10L 15/08* | (2006.01) |
| *G10L 15/26* | (2006.01) |

(52) U.S. Cl.
CPC ........ *G10L 15/26* (2013.01); *G10L 2015/088* (2013.01); *H04M 2201/40* (2013.01); *H04M 2203/552* (2013.01)

(58) Field of Classification Search
CPC ............ G06Q 10/06; G06Q 10/06316; G06Q 30/016; H04L 51/02; H04L 51/046; H04L 51/24; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5158; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04M 2203/40; H04M 2203/401; H04M 2203/2011; H04M 2203/2061; H04M 2242/00; H04M 2242/08; H04M 2242/12

USPC ............ 379/210.01, 265.01, 265.02, 265.03, 379/265.04, 265.05, 265.06, 26, 5.07, 379/265.08, 265.09, 265.1, 265.11, 379/265.12, 265.13, 265.14, 266.01, 379/266.02, 266.03, 266.04, 266.05, 379/266.06, 266.07, 6.08, 266.09, 266.1, 379/265.07, 266.08

See application file for complete search history.

(56) References Cited

U.S. PATENT DOCUMENTS

| | | | |
|---|---|---|---|
| 7,027,987 B1 * | 4/2006 | Franz | G10L 15/22 704/236 |
| 7,058,565 B2 * | 6/2006 | Gusler | G06Q 30/06 379/88.01 |
| 7,672,845 B2 * | 3/2010 | Beranek | 379/265.09 |
| 9,413,877 B2 * | 8/2016 | Aldrich | H04M 3/2281 |
| 10,264,125 B2 * | 4/2019 | Bernstein | H04M 3/5175 |
| 2003/0050854 A1 * | 3/2003 | Showghi | G06Q 10/02 705/15 |
| 2004/0002868 A1 * | 1/2004 | Geppert | H04M 15/00 704/277 |
| 2004/0098274 A1 * | 5/2004 | Dezonno | H04M 3/523 706/21 |
| 2004/0189697 A1 * | 9/2004 | Fukuoka | G06F 9/451 715/748 |
| 2008/0101565 A1 * | 5/2008 | Tyler | H04M 11/10 379/93.01 |
| 2010/0063880 A1 * | 3/2010 | Atsmon | G06Q 10/0637 705/14.53 |
| 2011/0010173 A1 * | 1/2011 | Scott | H04M 3/42221 704/235 |
| 2011/0125498 A1 * | 5/2011 | Pickering | G10L 15/22 704/246 |
| 2011/0243311 A1 * | 10/2011 | Aldrich | H04M 3/2281 379/88.14 |
| 2012/0016948 A1 * | 1/2012 | Sinha | G06Q 10/10 709/207 |
| 2017/0026515 A1 * | 1/2017 | Bernstein | H04M 3/5175 |
| 2017/0155760 A1 | 6/2017 | Aldrich et al. | |

* cited by examiner

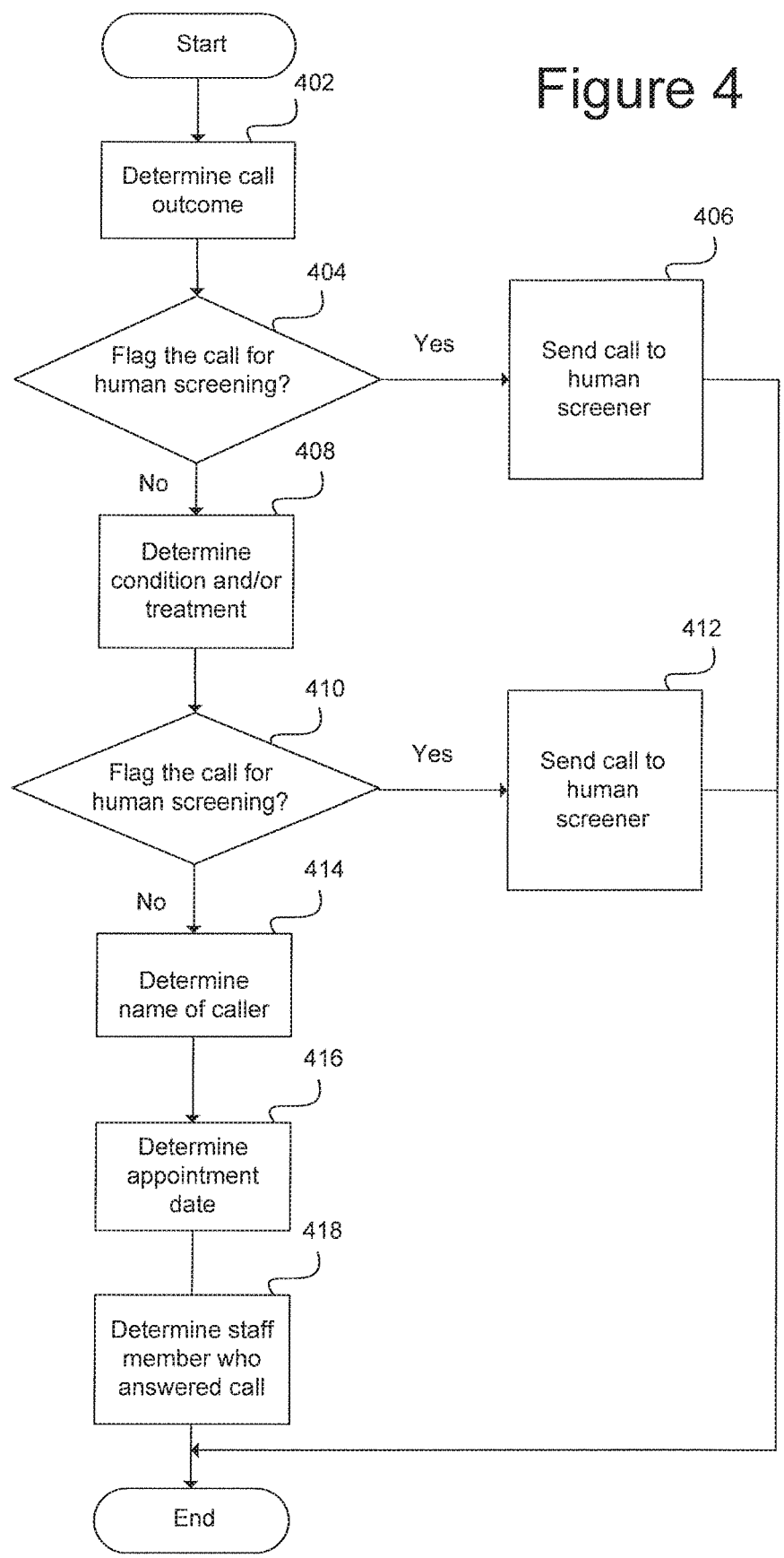

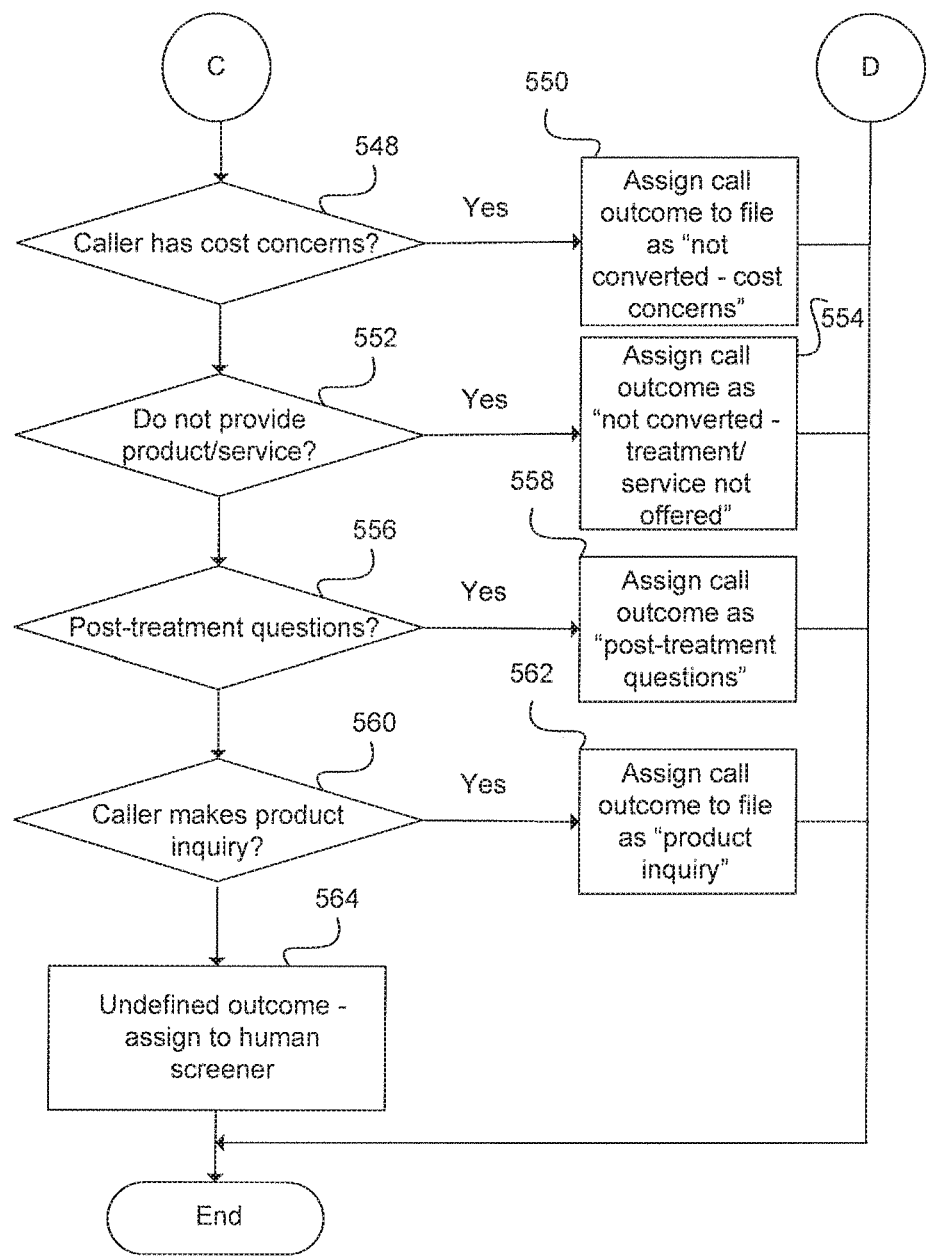

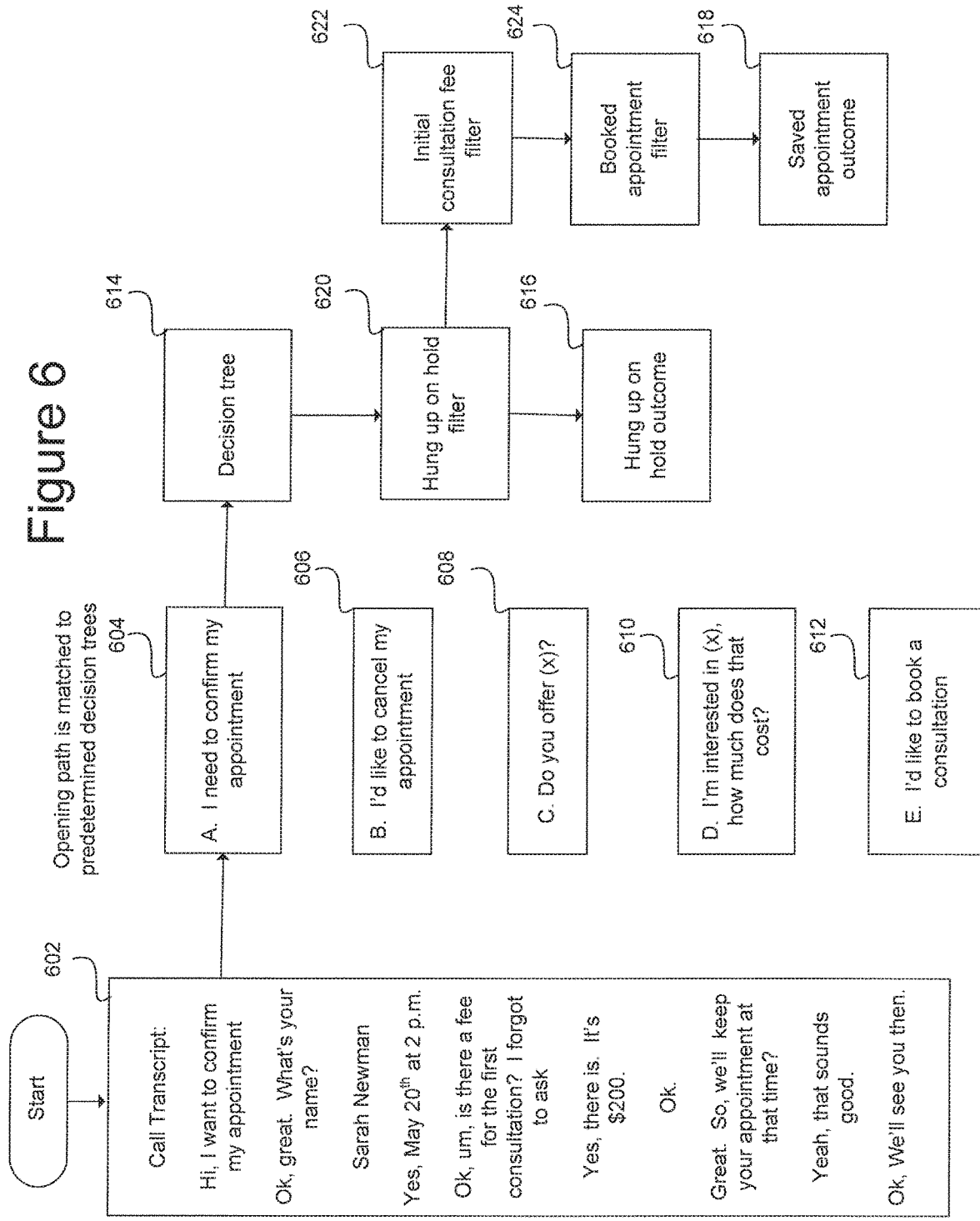

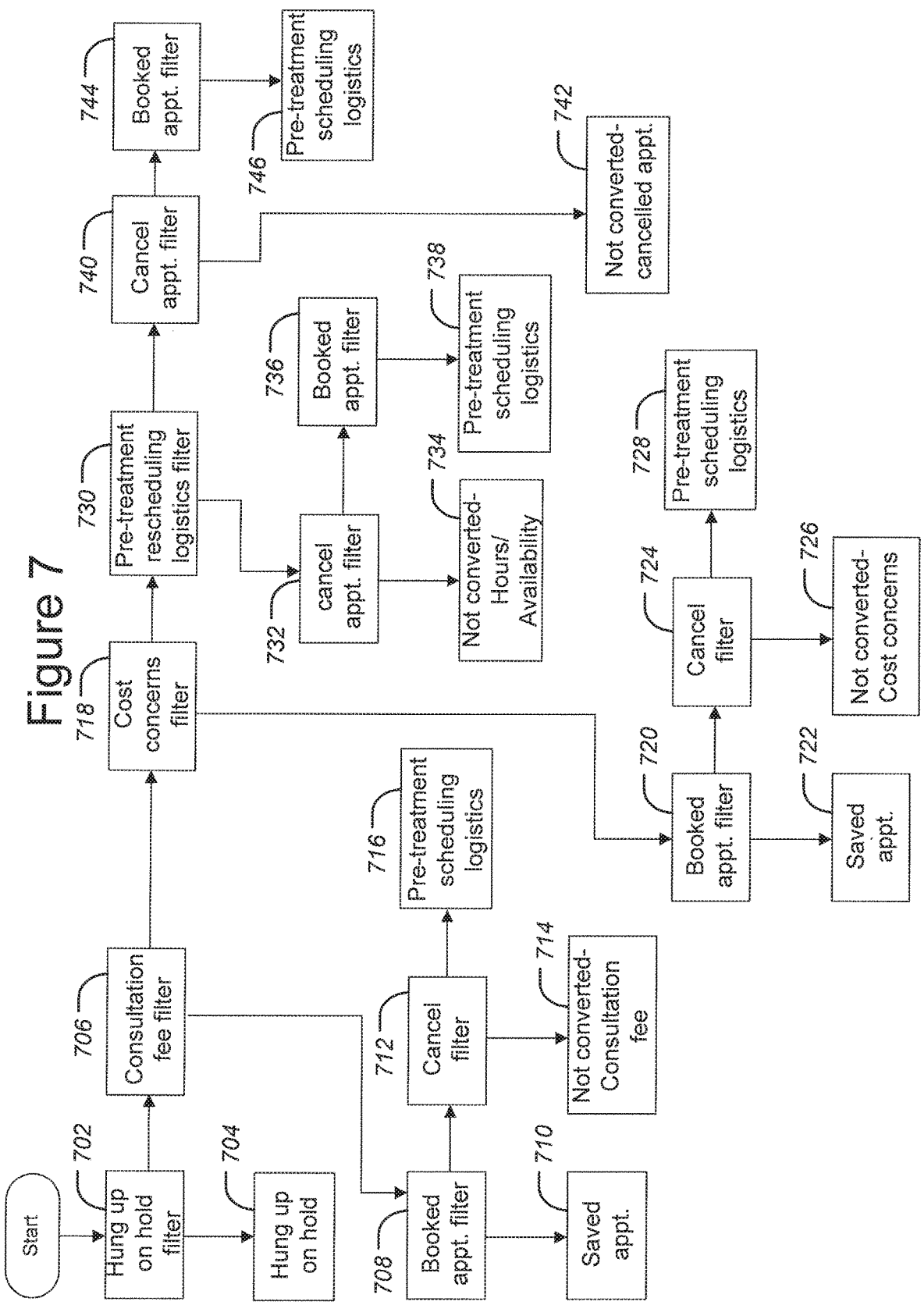

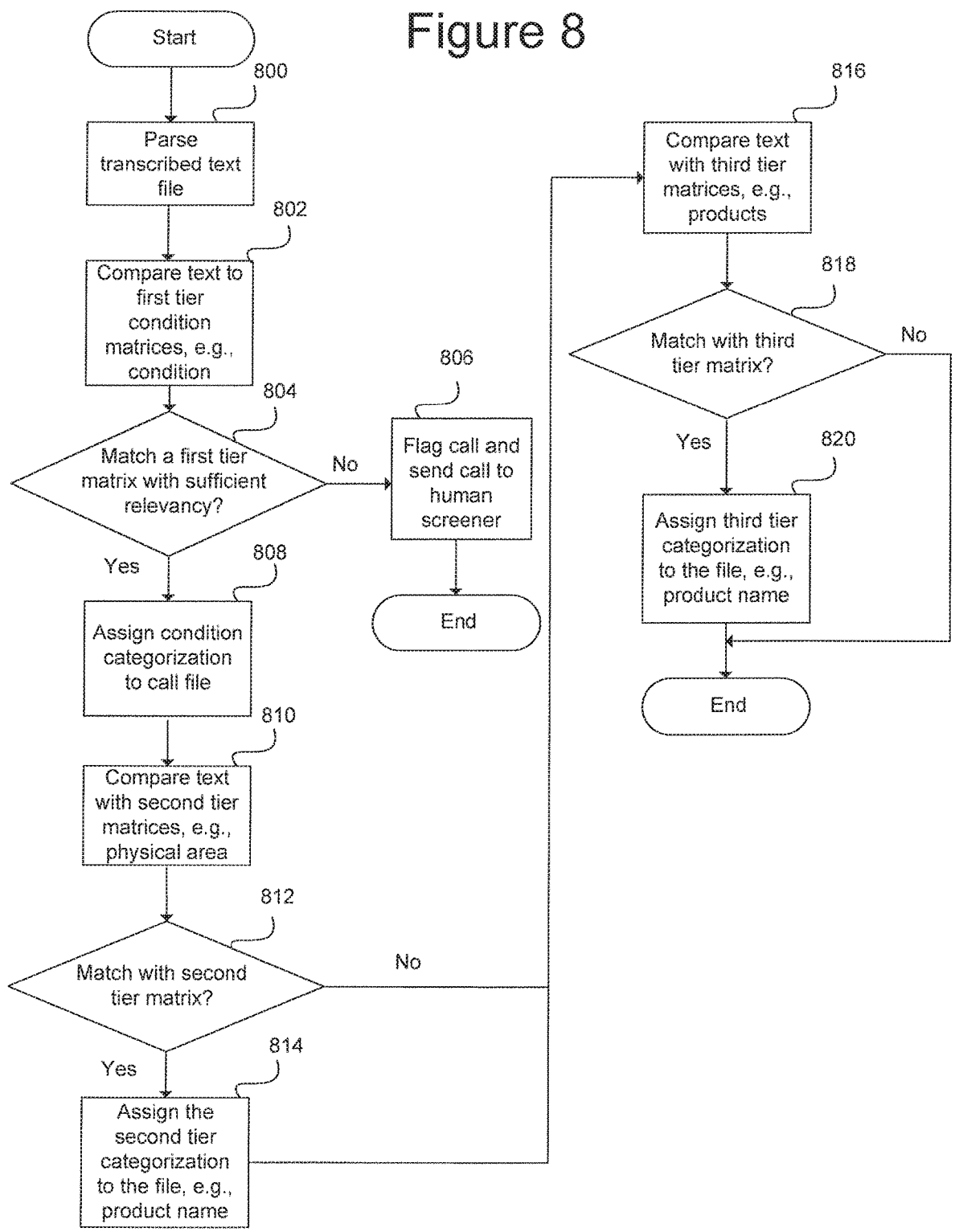

METHOD AND SYSTEM FOR ACCURATE AUTOMATIC CALL TRACKING AND ANALYSIS

RELATED APPLICATIONS

This application is a continuation of U.S. patent application Ser. No. 15/285,373 (now U.S. Pat. No. 10,264,125), entitled "Method And System For Automatic Call Tracking and Analysis," filed on Oct. 4, 2016, which is a continuation-in-part of U.S. patent application Ser. No. 15/229,444 entitled "Method And System For Automatic Call Tracking and Analysis," filed on Aug. 5, 2016, which is a divisional of U.S. patent application Ser. No. 12/750,523 (now U.S. Pat. No. 9,413,877), entitled "Method of Patient-Staff Analytics," filed on Mar. 30, 2010. The disclosure of the above applications is expressly incorporated herein by reference in its entirety.

TECHNICAL FIELD

This disclosure generally relates to phone tracking and analysis, and more particularly to methods and systems for automated phone call tracking and automatic phone call content and outcome analysis. This disclosure also relates to a method for automatically and accurately determining an outcome of a phone call by using signifiers as a way to increase accuracy without altering the flow of the conversation.

BACKGROUND

Conventionally, there is no readily accessible way for companies or organizations, such as medical practices, to monitor interactions between staff and potential or existing customers in an objective or quantifiable manner. Valuable data about a staff's performance in addressing concerns and needs of potential clients is often lost during the interaction due to lack of reporting mechanisms and poor internal communication. Companies and other organizations are unable to determine whether potential revenue is lost due to poor staff performance, whether marketing strategies are successful, whether staff are appropriately meeting the needs of clients, or whether the company is properly allocating its resources into capital investments in services or products driven by market demand. This lack of oversight causes companies and organization to incur significant loss of potential revenue while diminishing client satisfaction.

Conventional quality control call centers within an organization, or third-party quality control centers, record telephone calls for quality assurance purposes. For example, U.S. Pat. No. 6,724,887 ("Eilbacher") discloses a contact center which records and analyzes customer communications. The contact center includes a monitoring system which records customer communications, reviews the communications to identify parameters of the communications and determines whether the parameters of the customer communications indicate a negative or unsatisfactory experience. The analyzing unit performs a stress analysis on telephone calls to determine a stress parameter by processing the audio portions of the telephone calls to ultimately determine whether the experience of the caller 102 was satisfactory or unsatisfactory. However, this does not analyze the content or outcome of a call.

Typical conventional services are normally offered by consultants seeking to provide general advice for enhancing performance within a large organization. Such services are normally not affordable for many companies, such as smaller medical practices, interested in learning how well they perform with respect to other smaller companies. Furthermore, such conventional systems are intended to be provided infrequently using set parameters, and do not allow the user to constantly interact with the quality assurance system directly over a long period of time. These consultants may also not give actionable intelligence, and conventional automated systems do not give intelligence on the content or outcome of a call. They also do not provide for efficient lead generation tracking, e.g., determining how a caller found out about the business.

Furthermore, other conventional systems involve obtaining survey data from various businesses through questionnaires for the purposes of comparing the performance of the various staffs of each office. However, one problem with surveys is in obtaining accurate data from staff because staff employees may not be truthful in their interactions with clients. Staff may also not be aware of perceptions of themselves by clients. Conventionally, these businesses also have no ability to compare their office's performance with that of other offices of other comparable businesses.

One field typically suffering from many of the above-mentioned problems is the medical practice field. Medical practices often have difficulty knowing if their staff is successfully interacting with patients and potential patients when discussing potential treatments. However, many other companies and organizations, both large and small, suffer the same or similar problems.

Conventional systems do not automatically analyze the content of a call, providing analytics and the result of the outcome of a call Accordingly, there is a desire for to avoid these and other related problems.

SUMMARY

One aspect of the present disclosure is directed to a method in a data processing system for automatically and accurately determining an outcome of a phone call, specifically by using signifiers as a way to increase accuracy without altering the flow of the conversation. The method comprising may include receiving voice data of a phone call, transmitting a response communication based on the voice data (with the response communication including at least one audible or signifier), identifying, by at least one processor, the at least one audible or signifier in the response communication; and automatically determining the outcome of the phone call based on the audible or signifier in the response communication.

Another aspect of the present disclosure is directed to a data processing system for automatically determining an outcome of a phone call. The system may include a database comprising data associated with audibles and signifiers and a memory configured to store instructions. The instructions may cause a processor to receive voice data of a phone call, transmit a response communication based on the voice data, wherein the response communication includes at least one audible or signifier, identify the at least one audible or signifier in the response communication; and determine the outcome of the phone call based on the audible or signifier in the response communication.

Yet another aspect of the present disclosure is directed to a non-transitory computer-readable medium storing instructions which, when executed, cause one or more processors to perform a method for determining an outcome of a phone call The method may include receiving voice data of a phone call, transmitting a response communication based on the voice data (with the response communication including at least one audible or signifier), identifying, by at least one processor, the at least one audible or signifier in the response communication; and automatically determining the outcome of the phone call based on the audible or signifier in the response communication.

BRIEF DESCRIPTION OF THE DRAWINGS

FIG. 4 depicts a flow chart of a method and system for processing and analyzing a phone call in accordance with methods and systems consistent with disclosed embodiments.

FIGS. 5a-5c depict a flow chart of a method and system for determining the call outcome of a phone call in accordance with methods and systems consistent with disclosed embodiments.

FIG. 6 depicts a chart of a method and system for determining the call outcome of a phone call in accordance with methods and systems consistent with disclosed embodiments.

FIG. 7 shows an exemplary decision tree based on an exemplary initial path.

FIG. 8 depicts a flow chart of the process of determining a condition or treatment in a phone call.

DETAILED DESCRIPTION

Figure 1:
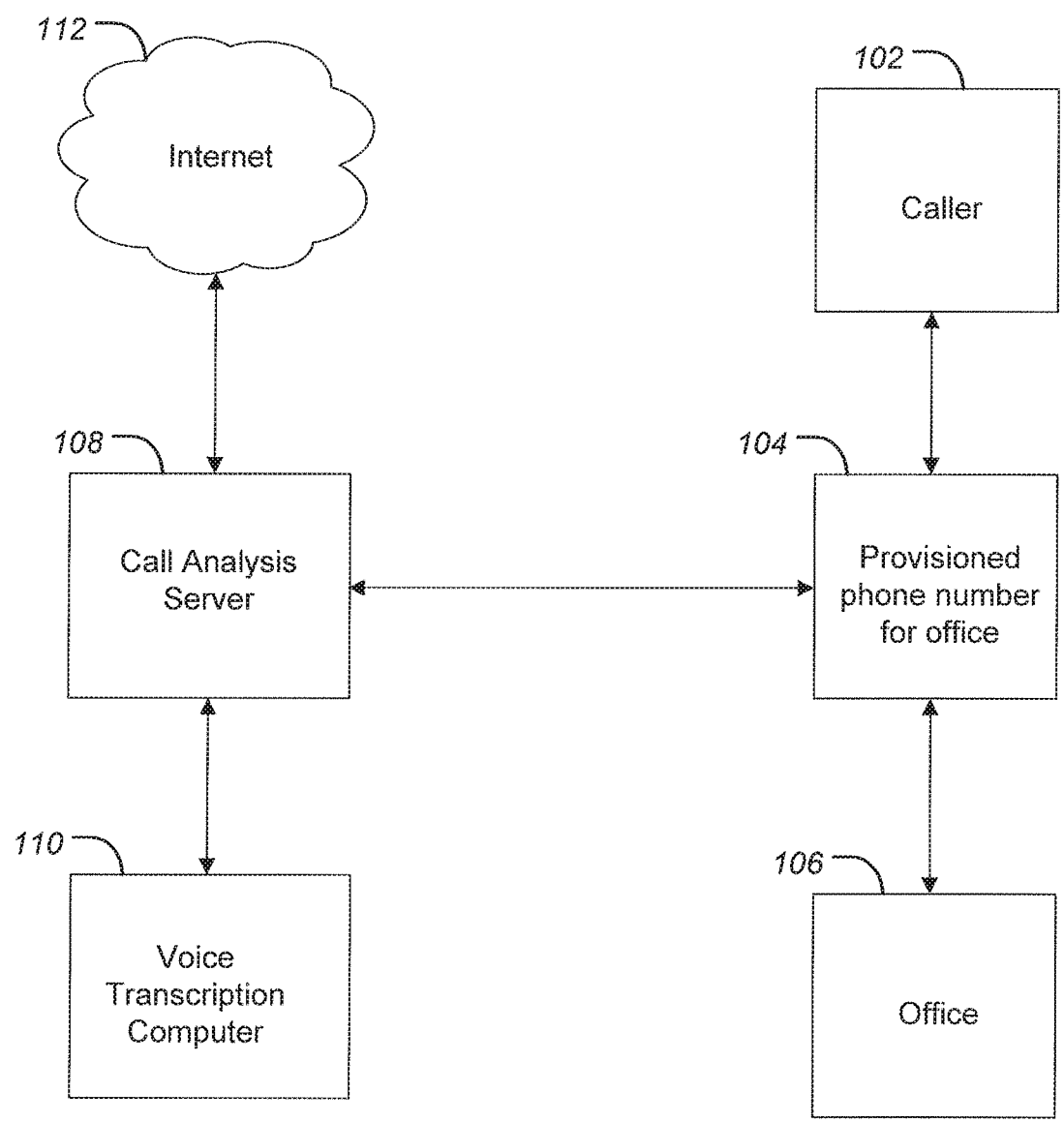
FIG. 1 illustrates a diagram of an exemplary computer system in accordance methods and systems consistent with disclosed embodiments.

Methods and systems in accordance with the disclosed embodiments provide communications tracking and analysis of the content and outcome of a call. The methods and systems described herein automatically and accurately determine an outcome of a phone call by using signifiers as a way to increase accuracy without altering the flow of the conversation. Therefore, these systems may provide businesses with the ability to track and view analytics of the number, content and various outcomes of calls, thereby providing up-to-date, automatically-generated real-time analysis of the results of client interactions with staff answering the phones. Methods and systems in accordance with the disclosed embodiments quantitatively and objectively analyze staff performance and marketing return on investment (ROI), and track customer demand across various procedures. This may automatically provide information on the number of calls with various outcomes, e.g., the customer booked an appointment, the customer hung up while on hold, the customer was connected with voicemail, the customer left a message on voicemail, the customer is an existing client, the customer did not book an appointment, the customer did not book due to cost concerns, the customer purchased a particular product, etc., as well as other details about the calls.

In one implementation, the methods and systems operate via an automated online software application that operates over a network such as the Internet. The application tracks and sorts incoming phone calls, automatically analyzes the phone calls, and generates reports that determine, for example, patient conversion, staff performance, marketing effectiveness, customer interests, and call outcomes. They may also provide comparative analysis reports with similar businesses.

In some embodiments, in order to improve the accuracy of the automated online software application, the phone call may be answered with a response communication that includes audibles or signifiers. Audibles and signifiers may be words, phrases, or noises that are recognized by the automated online software and determine the phone outcome. In such embodiments, the automated software online application may override other determinations based on the voice data if there are audibles or signifiers in the response communication. For example, in a phone call a user may make multiple inquiries and change the topic of conversation depending on the response obtained from office. Having audibles or signifiers that clearly define the outcome of the communication may improve the accuracy of the outcome determination. Additionally, voice data may be difficult to analyze if it contains high noise or poor recording quality. Then, in such embodiments the response communication with audibles or signifiers may improve the capacity of the system to correctly identify the call outcome.

Generally, when a phone call is received, and a response is provided, the system records the call, automatically transcribes the voice data from the call into text, and then analyzes the transcribed text file. In doing so, the system may determine the outcome of the call as well as other aspects of the content of the call. For example, the system may determine if a caller left a message, hung up, is an existing patient, booked an appointment, asked for information, purchased a particular product, did not book an appointment or if a certain course of action was determined. For example, in the medical field, the system may automatically determine the condition or treatment of the patient, e.g., the caller is likely suffering from a certain condition and likely needs a certain treatment or product.

In particular, in one implementation, methods and systems in accordance with the disclosed embodiments assist medical practices with tracking and analyzing patient and staff interaction analytics. The methods and systems record telephone conversations and/or other communications to obtain objective data to compile comparative reports across the medical sector, while at the same time enable access to actual recorded conversations for staff accountability and/or for use as specific examples of performance quality.

The analytics may be useful for businesses to determine the performance of the staff. For example, the booking percentage (percentage of callers who booked an appointment) may be an indicator of how well a staff is performing on the phone. In another example, a high percentage of calls having an outcome of a caller hanging up while on hold, may indicate that there are an insufficient amount of staff members to handle incoming calls. A call analytics may be very helpful for large companies and quality assurance procedures. The analytics provide the ability to compare with other similar businesses to see how the staff is performing in comparison with those businesses. The comparison with other businesses may include performance comparisons of booking percentage, waiting times, number of calls, etc. It also provides for the analysis of individual staff members, such as seeing which staff member has the highest or lowest booking percentage, the highest or lowest hang up rate, etc.

FIG. 1 illustrates a diagram of an exemplary computer system in accordance to methods and systems consistent with the disclosed embodiments. As shown, a caller 102 may call a provisioned phone number 104 specifically provisioned for a company, in this example office 106. Call analysis server 108 may provide and/or may have access to the provisioned phone number. Provisioned phone number 104 may be operated by a third-party provider, for example. In another implementation, caller 102 may call the office 106 directly, and the system may record the direct call. Provisioned phone number 104 may be correlated with, for example, a doctor's account on call analysis server 108. Call analysis server 108 may associate the call with office 106 based on the correlation. When the call comes through, the system may play a brief recording notifying caller 102. The message may indicate that the call is about to be recorded. The system may also immediately patch the call into office 106 seamlessly. The call may be then recorded by call analysis server 108, and the resulting data file is stored on the server's database (not shown). As discussed further below, the call may be transcribed by voice transcription computer 110. As also discussed below, call analysis server 108 may be connected to a network 112 such as the Internet, so that users may access the results of their call analytics reports for their offices. These and other components may be used.

Figure 2:
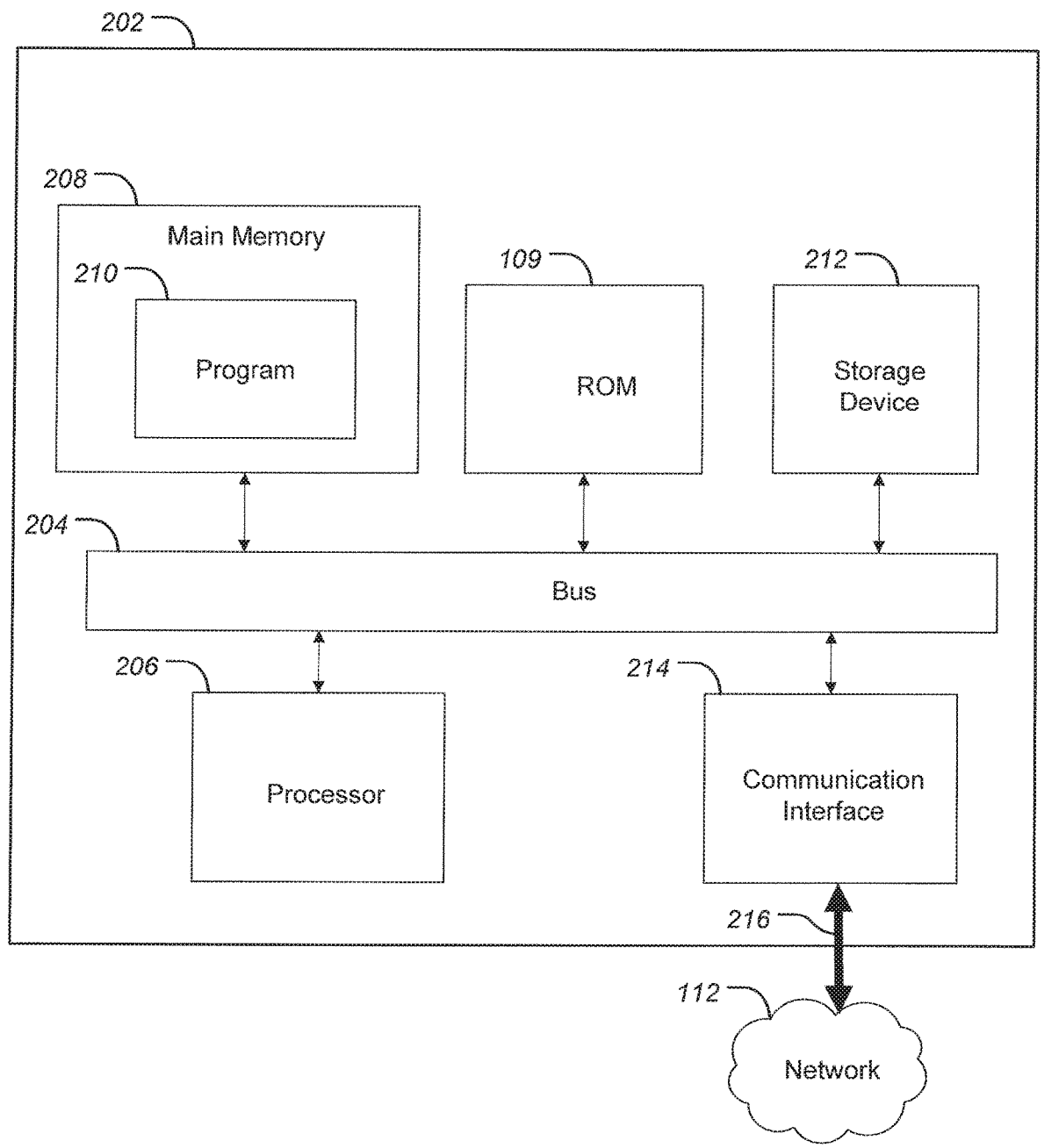
FIG. 2 depicts components of an exemplary computer in accordance with methods and systems consistent with disclosed embodiments.

FIG. 2 depicts components of an exemplary computer 202 in accordance with methods and systems consistent with the disclosed embodiments. Computer 202 may represent call analysis server 108, computers of office 106, a computer accessing call analysis server 108 over the network 112, voice transcription computer 110, or any other suitable component.

Computer 202 may include bus 204 or other communication mechanism for communicating information, and processor 206 coupled with bus 204 for processing the information. Computer 202 may also include a main memory 208, such as a random access memory (RAM) or other dynamic storage device, coupled to bus 204 for storing information and instructions to be executed by processor 206. In addition, main memory 208 may be used for storing temporary variables or other intermediate information during execution of instructions to be executed by processor 206. Main memory 208 may include a program 210 for implementing automatic call tracking, analysis and reporting in accordance with methods and systems consistent with the disclosed embodiments. Modules and filters discussed below may be part of this program 210 and/or stored in main memory 208. Computer 202 may further include read only memory (ROM) 109 or other static storage device coupled to bus 204 for storing static information and instructions for processor 206. Storage device 212, such as a magnetic disk or optical disk, may be provided and coupled to bus 204 for storing information and instructions.

According to one embodiment, processor 206 may execute one or more sequences of one or more instructions contained in main memory 208. Such instructions may be read into main memory 208 from another computer-readable medium, such as storage device 212. Execution of the sequences of instructions in main memory 208 may cause processor 206 to perform the process steps described herein. One or more processors in a multi-processing arrangement may also be employed to execute the sequences of instructions contained in main memory 208. In alternative embodiments, hard-wired circuitry may be used in place of or in combination with software instructions. Thus, embodiments are not limited to any specific combination of hardware circuitry and software.

Although described relative to main memory 208 and storage device 212, instructions and other aspects of methods and systems consistent with the disclosed embodiments may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, and/or any other medium from which a computer can read, either now known or later discovered.

Computer 202 may also include communication interface 214 coupled to bus 204. Communication interface 214 may provide a two-way data communication coupling to network link 216 that may be connected to network 112, such as the Internet or other computer network. Wireless links may also be implemented. In any such implementation, communication interface 214 may send and receive signals that carry digital data streams representing various types of information.

In one implementation, computer 202 may operate as a web server on a network 112 such as the Internet. Computer 202 may also represent other computers on the network 112, such as users' computers having web browsers, and the user's computers may have similar components as computer 202. As described above, the computer 202 may be a call analysis server having the components described above and may implement methods and systems consistent with the disclosed embodiments.

Figure 3:
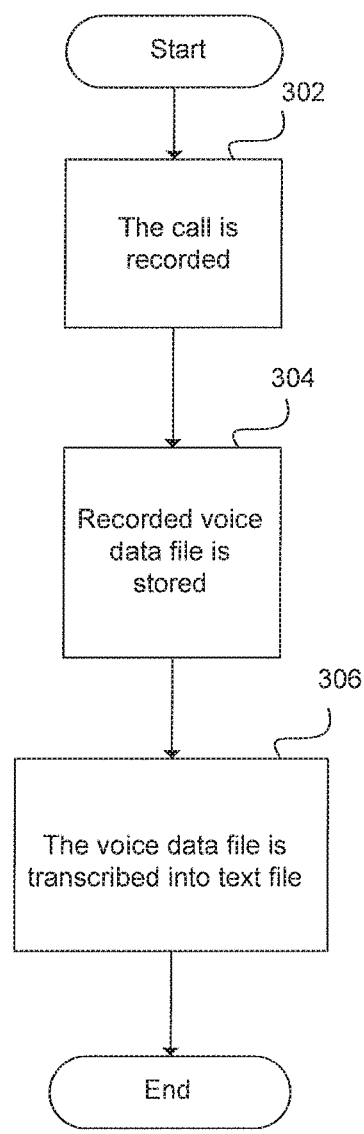
FIG. 3 illustrates a flow chart showing steps in a method for transcribing a call.

FIG. 3 illustrates a flow chart showing steps in a method for transcribing a call according to the disclosed embodiments. First, the call may be recorded (step 302), and the recorded voice data file may be stored (step 304). Next, the voice data file may be transcribed by voice transcription software and/or hardware, which may be located on the server 108, or may be a third-party voice transcription computer 110 (step 306). The voice data file may be transcribed into text, or in another implementation, into XML or any other suitable format. The voice data file may be run through various modules and filters described below during the analysis process.

FIG. 4 depicts a flow chart of a method and system for processing and analyzing a phone call in accordance with methods and systems consistent with the disclosed embodiments. Once the call's voice data file has been transcribed into text (see FIG. 3), the transcribed text may be then analyzed. The text may go through several modules and filters of analysis during this process. Modules and filters may be software or software subroutines, hardware, a combination of software and hardware, or any other suitable component. Modules and filters may examine the text of the file, search for key words and phrase patterns and may include logic statements used to match various features, as well as external factors associated with the call such as call duration. The first module may determine the call outcome (step 402), the process of which is described in further detail below (see FIG. 5). The call outcome may be, for example, caller 102 left a message, hung up while on hold, is an existing patient, booked an appointment, reached an answering service, or asked for information. However, other outcomes are also possible.

During the call outcome determination process, it may be determined that the call needs to be flagged for screening by a human screener. This may occur for several reasons including, for example, the system being unable to determine the outcome accurately due to the call not matching predetermined criteria or the call matching several potential options thereby leaving an ambiguity. If the call is flagged (step 404), it may be then routed to a human call screener either immediately or flagged for later screening by a human call screener (step 406). If the call is not flagged, the process may continue to the next module, in this case, the condition and treatment module (step 408).

However, flagging the call for human intervention may be not required. In one implementation, the call may be processed automatically by the call analysis server 108, and the likelihood of accuracy is assigned to the file and displayed after the processing. In addition, easier data to process (as described below) may be processed first so that the human screener is given as much data as possible before they begin their screening. Depending on the manner in which the system is set up, in one implementation, a vast majority (e.g., 85%) of calls may be screened automatically, and a minority of calls (e.g., 15%) into office 106 may be screened by humans. In addition, flagging may be used on some of the modules, but not all of them. For example, the call outcome and condition or treatment may be important to label, but the name of the patient, appointment date, and staff member may not be as important. In this case, the call outcome and condition or treatment may be able to be flagged, while the other modules are not.

This exemplary implementation involves a medical practice, particularly in the field of dermatology and plastic surgery. In this example, the condition and treatment module may automatically determine the condition and treatment for the patient in a medical setting (step 408). This information may be used for further granularity and analytics and is discussed in further detail below (see FIG. 7). During the condition and treatment process, it may be determined that the call needs to be flagged for screening by a human screener. If the call is flagged (step 410), it may be then routed to a human call screener either immediately or flagged for later screening by a human call screener (step 412). If the call is not flagged, the process may continue to the next module, in this case, the determination of caller 102 name (step 414).

Next, the system may determine the name of the patient in an additional module (step 414). In this process, the system may search the transcribed text file for the word "spell" and the spelling of any name in the call. For example, if a person on a call spells their name letter by letter, the system may be able to determine the name of caller 102. Alternatively, the system may have a list of common names or names of existing clients to search for in the text, or use caller ID information associated with caller 102 phone number. Any other suitable manner of determining the name may be used.

After determining the name of caller 102, the system may determine a date if any, in this case an appointment date (step 416). In other situations, the date determined may pertain something else. In one implementation, this process may be bypassed if the assigned call outcome was "answering service," "hung up on hold," or "left a message." In this process, the system may search the message data file to identity an agreed-upon date of an appointment. The system may search for dates in the text, possibly in conjunction with the word "appointment." Outside data may also be used as well For example, if caller 102 says "August 4th," the system may insert the current year at the end to make it "August 4th, 2010." The appointment time may also be determined similarly. Any other suitable manner of determining the date or time may be used.

Finally, the staff member who answered the phone call may be determined (step 418). In one implementation, this may be determined by searching the text file for a name and comparing it to inputted staff member names from that office. In addition, many times, staff members introduce themselves on a phone call, often at the beginning of the call as the call is answered. In another implementation, this may be determined by comparing a voice sample in the voice data file with previously-recorded voice samples of staff members, possibly stored in an MP3 file. This comparison may be done with third-party software or systems. When these names, dates, outcomes and conditions or treatments are determined, they may be assigned and save to a call file for reporting. The information may be stored in a database, for example.

Figure 5A:
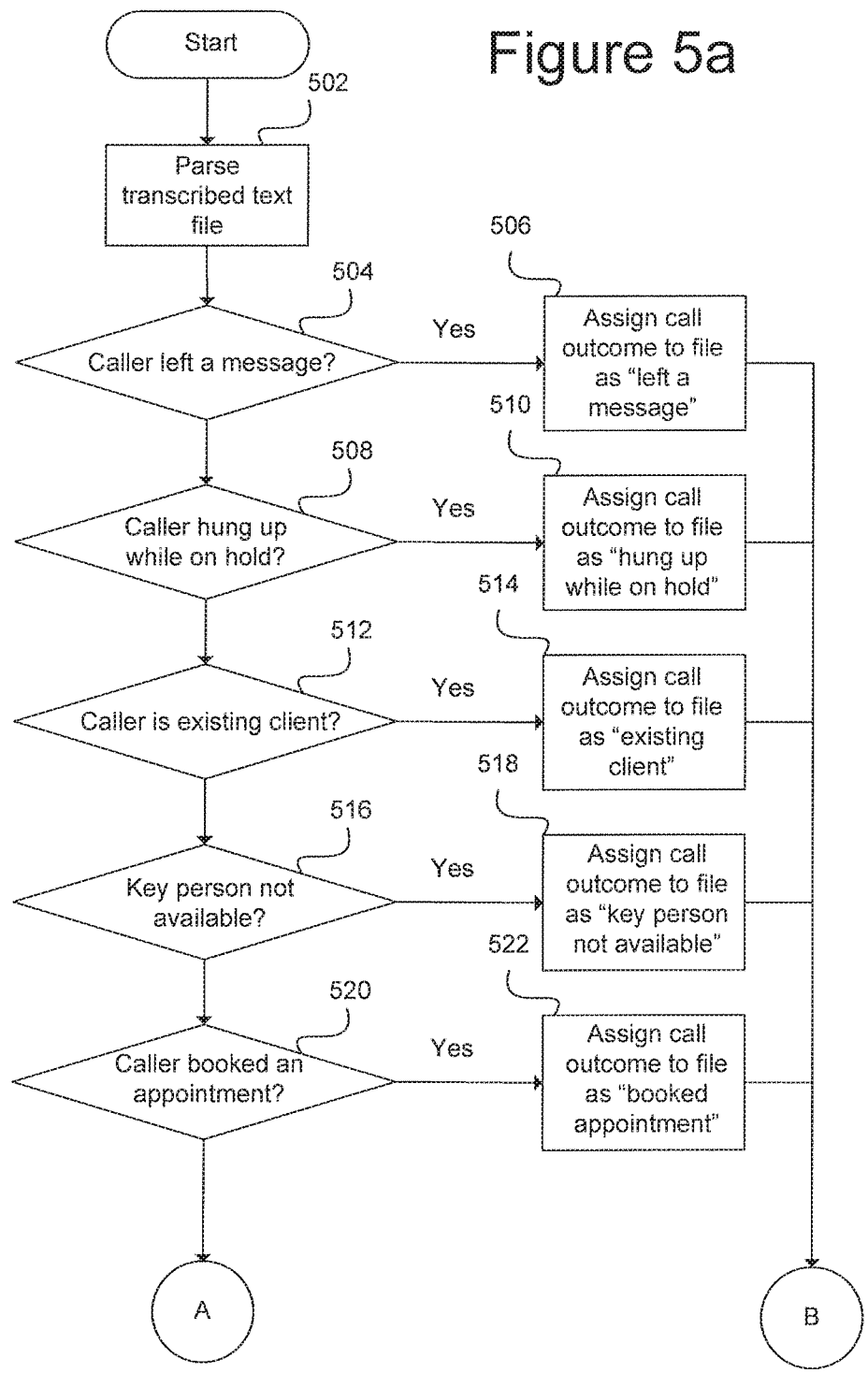
Figure 5B:
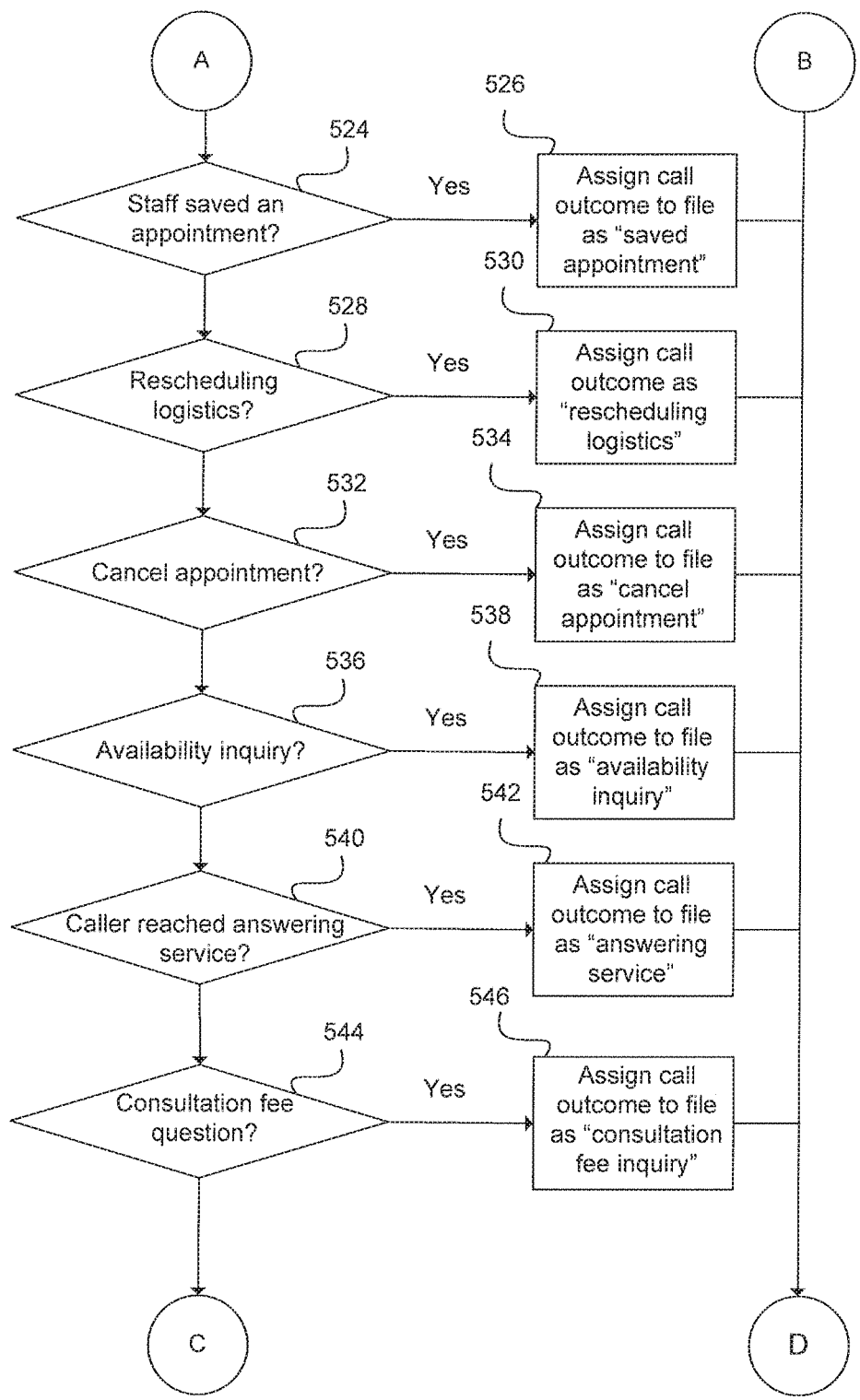

FIGS. 5*a*-5*c* depict exemplary flow charts of a method and system for determining the call outcome of a phone call in accordance with methods and systems consistent with the disclosed embodiments. To determine the outcome of a call, the call may be monitored and transcribed as above. The transcribed text file of the call is then parsed (step 502). The text may be run through several filters sequentially, which, in one implementation, are in a purposeful order. For example, if caller 102 booked an appointment and then hung up while on hold, the hang up while on hold outcome may trump the booked appointment, and the outcome would be a hang up while on hold. As such, this outcome may be determined first before getting to the booked appointment outcome. For example, the first two outcomes (e.g., hung up on hold and left a message) are definitive and may not be based on keyword matching like some other filters. False positives could result if they were not considered first, e.g., a person who inquires about a consultation fee and then hangs up while on hold has an outcome of hang up on hold even though they inquired about a consultation fee first.

In one implementation, the various outcome modules may be checked against the transcribed text in a sequential order, running through as many of the checks as needed before a definitive answer may be determined. In another implementation described in further detail below, all of the modules may not be checked in order, but rather after an initial check on the beginning of the phone call, a path is determined that narrows down the possible remaining modules that may apply to the call, and only those modules are checked. This may be done in the form of a "decision tree" that reduces the possibilities left as the process progresses.

In one implementation, the call analysis server 108 may first check whether caller 102 left a message (step 504) by sending the transcribed text through a left a message filter. This filter may determine whether caller 102 left a message in several ways, including, but not limited to, identifying key indicators such as checking for speech after a beep. Also, the transcribed text file may be scanned for keywords that are commonly used with an answering machine (e.g., "leave a message," "we will return your call," etc.) If caller 102 left a message, a call outcome may be assigned to the call file (step 506), and the process may continue to the next module (e.g., the condition/treatment module, see FIG. 4).

Next, the call analysis server 108 may determine if caller 102 hung up while on hold (step 508). Potential key indicators of this may include caller 102 hanging up while music is playing, caller 102 hanging up while a voice recording is playing, or any other suitable indicator. If caller 102 hung up while on hold, a call outcome may be assigned to the call file indicating a hang up while on hold (step 510), and the process may continue to the next module.

Then, the next filter in the system may determine whether caller 102 is an existing patient or client (step 512). It may do so in any of a number of suitable manners, including, for example, searching the text file for key indicators or keywords such as common questions and answers and making a determination based on them. For example, if the phrase "are you an existing patient?" is followed by the word "yes," it may be an indication of caller 102 being an existing patient. Other questions and answers may be used in the search of the text file. In addition, the text file may be searched to determine if caller 102 is calling to confirm or cancel an existing appointment, which may also be an indication that caller 102 is an existing patient. For instance, the system may search for the words "cancel" and "appointment." Although caller 102 could bring up the word "cancel" when booking an appointment (e.g., asking about a cancellation policy), the system may distinguish between these two types of calls by the call duration, whereas caller 102 cancelling an appointment might take less time. Other phrases may be searched to determine if caller 102 is an existing patient including, for example, the phrases "I was a patient there years ago," "I think I made an appointment there," or "I need to make a follow-up appointment." Other suitable indicators of an existing patient may also be used. If caller 102 is an existing patient, a call outcome may be assigned to the call file indicating that caller 102 is an existing patient (step 514), and the process may continue to the next module.

In the next filter, call analysis server 108 may determine whether caller 102 was calling for a key person who was not available (step 516). Call analysis server 108 may determine this by searching for inquiries into a condition or treatment and/or booking an appointment, and the staff may reply with a phrase such as "x isn't available," or "x is with a patient," "can I have her/him call you," and caller 102 or staff may state caller 102 phone number for a return call, e.g., "5-5-5-2-1-6-5-2-0-9." In this case, call analysis server 108 may assign a key person not available call outcome of (step 518).

Then, the next filter in the system determines if caller 102 booked an appointment (step 520). The filter may search for key indicators in the text file such as a date (that is being scheduled) and the words "appointment" or "consultation." The system may also search for a spelling of the patient's name as an indicator that they are booking an appointment. Other suitable indicators may also be used. If the system determines that caller 102 booked an appointment, the call file may be assigned an outcome of booked an appointment (step 522), and the system continues to the next module.

Call analysis server 108 may also determine if the call outcome is that a previously-made appointment is saved from being canceled, a special circumstance when a patient calls with a prior appointment (mentioning to confirm, reschedule, etc.) and begins to ask cost questions or treatment effectiveness, and the staff keeps the patient with their current appointment rather than cancelling (step 524). In such a call may begin with terms such as "rescheduling," "confirming" or "canceling," and include further discussions regarding cost, treatment effectiveness, etc. and then discussion regarding keeping the current appointment, e.g., "see you on x date." Call analysis server 108 may determine this outcome by analyzing, for example, the length of the call, whereas these calls may be typically longer than average calls. If it is determined that the staff saved an appointment from being cancelled, a call outcome of saved appointment may be assigned (step 526), and the system may continue to the next module.

Another potential call outcome may be pre-treatment rescheduling/logistics. Call analysis server 108 may determine if a patient reschedules a booked appointment (step 528). For example, call analysis server 108 may determine if a patient mentions they "have an appointment" or "need to confirm" their appointment, and may reschedule to a new date when they will come in. It may also include logistical questions like "I have an appointment," "how do I get to the office," or "where are you located," etc. and may end with phrases such as "ok, that works," "see you on x date," etc. Other suitable indicators may also be used. If the appointment is rescheduled, and does not classify as a saved appointment, it may be assigned a call outcome of pre-treatment rescheduling logistics (step 530).

Call analysis server 108 may also determine if caller 102 called to cancel an existing appointment (step 532). For example, for caller 102 who has an appointment already scheduled, call analysis server 108 may search for the phrase "cancel their appointment" and may determine that caller 102 does not reschedule to a new date or time. Such a call may begin with phrases such as "rescheduling," "confirming" or "canceling" an appointment, and may end with the canceled appointment the end, e.g., the phrase "your appointment is cancelled)." If it is determined that caller 102 canceled an existing appointment, the canceled appointment call outcome is assigned (step 534) and the system may continue to the next module.

Moreover, call analysis server 108 may determine that caller 102 was inquiring about an appointment but could not find convenient hours and availability for an appointment (step 536). In this case, caller 102 may have a prior appointment or be a new patient, and after stating a phrase such as "make an appointment," "come in for a consultation" or "when can I come in," the office staff offers appointment dates that caller 102 cannot agree to, i.e., it is not a booked appointment outcome. It may be determined that appointment was not booked due to lack of availability, and the availability outcome is assigned (step 538).

The next filter in the system may determine whether caller 102 was connected to an answering service (step 540), for example, by searching for key phrases in the text file such as "office" or "answering service." The system could also retrieve the office hours or reasonable hours for that time zone to confirm. This may also involve the office personnel inputting the hours their answering service is active to the system. If the system determines that caller 102 was connected to the answering service, the call file may be assigned an outcome of answer service (step 542), and the system may continue to the next module.

Call analysis server 108 may determine that caller 102 inquired about an initial consultation fee and/or did not book an appointment as a result of there being a consultation fee (step 544). This may be determined by searching for phrases such as "consultation fee," "initial consultation," and "cost to come in," etc. A not converted due to consultation fee inquiry call outcome may be assigned (step 546). Other suitable indicators may also be used, and the system may move to the next module after assigning the associated outcome.

Call analysis server 108 may detect that caller 102 had cost concerns and/or didn't book an appointment as a result of there being cost concerns by determining if caller 102 makes an inquiry about a certain condition or treatment and states various phrases such as "how much does it cost,"

"payment plans," "financing," etc. (step 548). Furthermore, the call may end with terms such as "Ok, thanks," "I will call back," etc. indicating caller 102 did not book an appointment, and that cost concerns could be primary reason why. Other suitable indicators may also be used. In this case, a cost concerns call outcome is assigned (step 550). Again, other suitable indicators may also be used, and the system moves to the next module after assigning the associated outcome.

Call analysis server 108 may also determine that caller 102 was informed that the office does not provide the product or service caller 102 desired (step 552). For example, if caller 102 inquires about a specific condition or treatment, and the staff replies "we don't offer x," "we don't treat x," "we don't have x," it may be determined to be a product/service not offered call outcome (step 554).

One general category of call outcomes may be post-treatment questions. Call analysis server 108 may determine that caller 102 is calling regarding side effects, post-operation care, or prescription refills (step 556). To determine if caller 102 is calling about side effects, call analysis server 108 may search for phrases indicating that caller 102 is an existing patient as described above, e.g., "I saw Dr. Jones," or "I just had treatment," and caller 102 asks questions regarding "redness," "burning," "bleeding," or "pain" for example. These indications, in addition to the call not falling into the booked outcome condition may indicate post-treatment questions, and that outcome may then be assigned (step 558).

An additional general category may be a product inquiry. Call analysis server 108 may determine, for example, if caller 102 calls in reference to a particular product (for example, cross referenced from the office's products as described further under Conditions/Treatments), and office 106 confirms that they have it (step 560). Call analysis server 108 may determine that the customer or patient has stated a product name and/or other phrases such as "can you ship that to me," etc. A product inquiry call outcome may be assigned in such a case (step 562). If the call matches none of these, it may be flagged for human screening (step 564) and/or given a call outcome of undefined.

FIG. 6 depicts an exemplary flow-chart of a method and system for determining the call outcome of a phone call in accordance with methods and systems consistent with the disclosed embodiments. In one implementation, the call outcome may not be determined linearly as previously described, but rather by a particular path down a "decision tree" having branches of paths that end in various call outcomes. This implementation may be a preferred implementation over the previously described linear process due to potentially increased efficiency. In such an implementation, less comparisons, filters or evaluations may need to be made to determine the call outcome. This implementation may also be somewhat predictive of a call outcome, because once an initial determination is made, the remaining possibilities left in the decision tree may be greatly reduced. This may reduce the need to go through many modules and filters sequentially.

In this implementation, the beginning of call transcript 602 may be first analyzed. Typically, the sentences at the beginning of a call may determine the outcome or may limit the likely possibilities of the outcome of the call. For example, when a person begins speaking, the first thing they ask for may be a significant indication of the likely outcome(s) of the call. This indication may choose an associated decision tree of paths of possible outcome and decisions to be made to determine the outcome.

First, the initial portion of the call may be parsed, and this portion may be of any length, e.g., the first 15 seconds of the call, the first three sentences, etc. It may be searched for one of several exemplary opening paths 604-612. The initial portion of the call may be searched to see if it fits one of several categories which may determine the initial path and decision tree used, including, for example, "I need to confirm my appointment," 604 "I'd like to cancel my appointment," 606 "Do you offer (x)?" 608 "I'm interested in (x), how much does that cost?" 610 "I'd like to book a consultation, etc." 612. For example, if the call begins with the sentence "Hi, I want to confirm my appointment," it may be determined that it is likely that caller 102 has an appointment and a corresponding particular decision tree 614 should be traversed to determine the outcomes. For example, this decision tree 614 may have the call outcomes of hung up on hold 616, a saved booked appointment 618, or any other suitable outcome, i.e., the likely call outcomes from the initial portion of the call. The filters 620-624 may be traversed until the process arrives at an outcome 616-618. The example outcomes and filters shown on FIG. 6 are merely examples and are not an exhaustive list. Although not shown on the figure, a decision tree may be associated with each of these initial paths 604-612.

This decision tree may not include many of the other call outcomes due to the unlikelihood of resulting in those call outcomes from the initial portion of the conversation. As such, this decision tree may be traversed to the correct call outcome quicker. The resulting reduced number of call outcomes in the decision tree may be traversed with keyword matching and other indicators as described previously. Decision trees may be designed in any manner and may be adapted to many different purposes and industries.

FIG. 7 shows an exemplary decision tree based on an exemplary initial path. The decision tree may have several different call outcomes as the various end nodes of the tree. For example, if the previously mentioned call ("I need to confirm my appointment") requested a confirmation of the appointment, it may result in several likely call outcomes (e.g., Pre-treatment rescheduling/logistics, saved booked appointment, not converted due to consultation fee, etc.) The decision tree process may then check a first tier of filters or path identifiers to determine the path that will be traversed. In one implementation, this first tier of filters is traversed in sequential order. As shown on FIG. 7, this exemplary decision tree has six filters in the first tier. In this case, the first filter in the decision tree is the hung-up-on-hold filter 702 previously described. If this filter 702 is satisfied, then the system may traverse the decision tree to the outcome hung-up-on-hold 704. Many of the filters described below may be the same or similar to filters or modules previously described above.

If this first filter hung-up-on-hold filter 702 is not triggered, the system may move to the next filter on the first tier which is a not converted due to consultation fee filter 706. In this example, this filter may determine if caller 102 inquired about a consultation fee before proceeding to a second tier of filters. The rest of the decision tree past the second tier may include outcomes that are probably and/or possible given the results of the previous path in the tree (i.e., caller needs to confirm appointment and is asking about a consultation fee). If the answer is yes, the decision tree may examine the call with the first filter in the second tier, in this case, a booked appointment filter 708. If the booked appointment filter determines that caller 102 maintained their booked appointment, a saved appointment outcome 710 may be assigned because caller 102 kept the appointment despite the hesitancy over the cost of the consultation fee.

If the booked appointment filter 708 determines that is not a booked appointment, call analysis server 108 may continue to the next second tier filter, a cancelled appointment filter 712 in this example. If the cancel appointment filter determines that caller 102 wants to cancel the appointment, a call outcome of not converted due to consultation fee may be assigned 714. If the appointment is not canceled at that point, it may default to the most likely outcome at this stage in the path resulting in an outcome of pre-treatment rescheduling logistics 716.

If consultation fee filter 706 on the first tier of the decision tree determines that the consultation fee was not inquired into, the process may continue to the third filter on the first tier, cost concerns filter 718. If the cost concerns filter determines that caller 102 has cost concerns, it may continue to the second tier filters under the cost concerns filter 718. Here, the first second-tier filter is booked appointment filter 720. If booked appointment filter 720 determines that caller 102 maintained the booked appointment despite the cost concerns, saved booked appointment outcome may be assigned 722. If the booked appointment filter 720 determines that the appointment was not booked, call analysis server 108 may continue to the next second tier filter 724. In this example, this filter is cancel appointment filter 724. If the cancel appointment filter 724 determines that caller 102 wants to cancel the appointment, a call outcome of not converted-cost concerns 726 may be assigned. If the appointment is not canceled at that point, an outcome of pre-treatment rescheduling logistics 728 may be assigned.

If the cost concerns filter 718 on the first tier returns a negative result, the process may continue to the fourth filter on the first tier, in this case, pre-treatment rescheduling logistics filter 730. After calling to confirm their appointment, if caller 102 indicates a desire to reschedule their existing appointment to another date, the process may continue down the decision tree to the first second-tier filter, a canceled appointment filter 732. If this filter 732 determines that caller 102 is canceling their appointment because they could not find an alternative date that was satisfactory, an outcome of not-converted-hours and availability 734 may be returned. Here, the second, second-tier filter is a booked appointment filter 736. If the booked appointment filter 736 determines that caller 102 successfully reschedules their booked appointment, pre-treatment rescheduling/logistics outcome 738 may be assigned to the call file.

If fourth, first-tier filter 730 returns a negative, the system may proceed to the fifth, first-tier filter, which is cancel filter 740. If this filter 740 is triggered, a call outcome of not-converted-canceled appointment 742 may be returned. It is noted, for example, although two tiers are shown here, any number of tiers of filters may be used.

Finally, if the fifth, first-tier filter 740 returns a negative, booked appointment filter 744 may be checked. In one implementation, the most likely outcome of the decision tree (in this case, based on "I need to confirm my appointment"), if none of the other first tier filters were triggered, may be the last filter on the first tier. In this instance, caller 102 may ask to confirm their appointment, and then may confirm that they will be attending their booked appointment. If this filter 744 determines that it is a booked appointment, the outcome of pre-treatment rescheduling and logistics 746 may be returned.

This process may also give an indication of the likely nature of a call to a human screener even if call analysis server 108 cannot accurately determine an exact call outcome and flags the call for further human screening, or make the most likely determination of the outcome based on how and where the call progressed through the decision tree. These decision trees may be short and simple or longer or complicated and may be designed to facilitate the purpose for which the call system is being used, whether it is a small medical office, a large computer company, or any other organization. Additionally, there may be some call outcomes that, in one implementation are common to all decision trees, such as the hung up on hold call outcome, for example.

FIG. 8 depicts an exemplary flow chart of the process of determining a condition or treatment. In one implementation, this process may be used to determine a condition or treatment in a dermatological and plastic surgery setting. However, other conditions or aspects of caller 102 phone call may be determined for any suitable industry or purpose. For example, the instead of a condition or treatment, the system may determine the subject matter of the call, whether caller 102 question was answered, whether caller 102 is satisfied with the result of the call, whether a particular product is discussed, whether there is a customer service complaint, whether a type of service was discussed, or any other suitable aspect. First, the system may parse the transcribed text file (step 800). In one implementation, the system may use the previously parsed transcribed text file (see FIG. 5). Then, to determine a categorization indicating a condition, the system may match the transcribed text file to a phrase matrix that is associated with a specific condition or treatment category and applies additional logic on how the phrases appear together, what order, frequency, relevancy, etc. (step 802). The matrix may be a list of terms that are relevant or indicative of the condition. The condition may be determined by the strength of the text file's relevance to a particular condition or treatment matrix and logic. If the matrix matches the text, that particular condition may be assigned to the call file.

For example, a categorization matrix for "laser hair removal" may include the words "unwanted hair," "waxing," "shaving," "hair removal," etc. If the text conversation includes one or more of these words, the system may consider this categorization for the condition for the file when it has been compared to this matrix. For example, if a patient states "I have some unwanted hair on my upper lip, and waxing and shaving have not been helping, so I'd like to explore other options," and the staff responds "Okay. Are looking for laser treatment? Our Gmax product is great for that," this may be put into a first categorization of "laser hair removal" which may be triggered by keywords "unwanted hair," "waxing," and "shaving."

The categorization may be set up to trigger when one of the terms exists in the conversation or any number of the terms, or all of the terms may be required. For example the condition may be triggered if two or more of the terms appear in the conversation. Logic rules may also be applied, for example, including determining where in the syntax the word appears to govern whether the condition is triggered for the categorization. Relevancy strength may be considered when matching a conversation to a condition matrix.

Furthermore, many other matrices may exist. There may often be overlap between one or more matrices. Relevancies or priorities may be set up between different condition matrices. For example, if more terms of one matrix show up than another matrix, even though terms from both exist in the conversation, the system may create a preference for one over the other. The logic may be set up in any number of ways. Some matrices, or terms in a matrix, may have higher rankings for priority than others. For example, if the word "wax" shows up, it may indicate a higher chance that it is a laser hair removal than other treatments or conditions. It may also possibly indicate more than one treatment or condition.

In one exemplary implementation, the first condition categorization may be considered important or necessary, so if there is no match (step 804), the call may be flagged and sent to a human screener (step 806). If the relevancy threshold is met (step 804), the condition or treatment category, e.g., laser hair removal, may be assigned to the file (step 808) and the process moves to the next attribute.

Next, based on the first categorization, a second-tier categorization assignment may occur by comparing the text to a second tier of matrices (step 810). In this case, the second tier identifies the physical area of the condition or treatment. For example, given the previous example conversation transcription, the system may determine that the second categorization is "facial hair" due to the matching of the text to a matrix including key words such as "upper lip," "eyebrows," "chin," "cheek," etc. Different first categorization conditions have different second-tier categorization matrices associated with them. For example, "laser hair removal" may have different physical areas associated with it than "stretch marks" would. That is, different physical areas may have their own matrices, e.g., one for facial hair, one for leg hair, etc. If the physical area category is present (step 812), the second categorization is applied to the file, e.g., "upper lip," "facial hair" (step 814). If it is not present, the system may move to the next categorization comparison in the process without assigning an additional physical area categorization to the file.

The system then may identify a third categorization, in this case, any specific or trademarked medical devices, products, or prescriptions by comparing the transcribed text to matrices with known names, aliases, slang, or references (step 816). It may compare the text to a particular product matrix and then may assign the corresponding attribute to the file. Preference to assigning the value is given to devices, products or prescriptions that fall within the previously assigned condition or treatment categories above. For example, from the previous example discussion transcription, the third categorization may be "Gentlemax by Candela" which may be triggered by various keywords such as "Gentle Max," "GeeMax," "Gmax," "Candela Gentlemax," etc. If a specific product or prescription is present (step 818), the third categorization assignment, e.g., Gentlemax by Candela, may be applied to the file (step 820).

Although described with respect to dermatology and plastic surgery, this process is applicable to other industries. Depending on the industry, environment or purpose in which the process is used, any number of suitable categorizations may be used and applied to any aspects that are appropriate. Similar to above, the categorizations may be performed by matching the transcribed file with lists of keywords, or other logical conditions that may determine whether the discussion is appropriate for that particular categorization. These conditions and categorizations may be used and adapted to other industries and aspects. For example, instead of a condition of a patient, the system may determine a product sold, such as a television, or any other suitable feature or aspect of the business.

Figure 9:
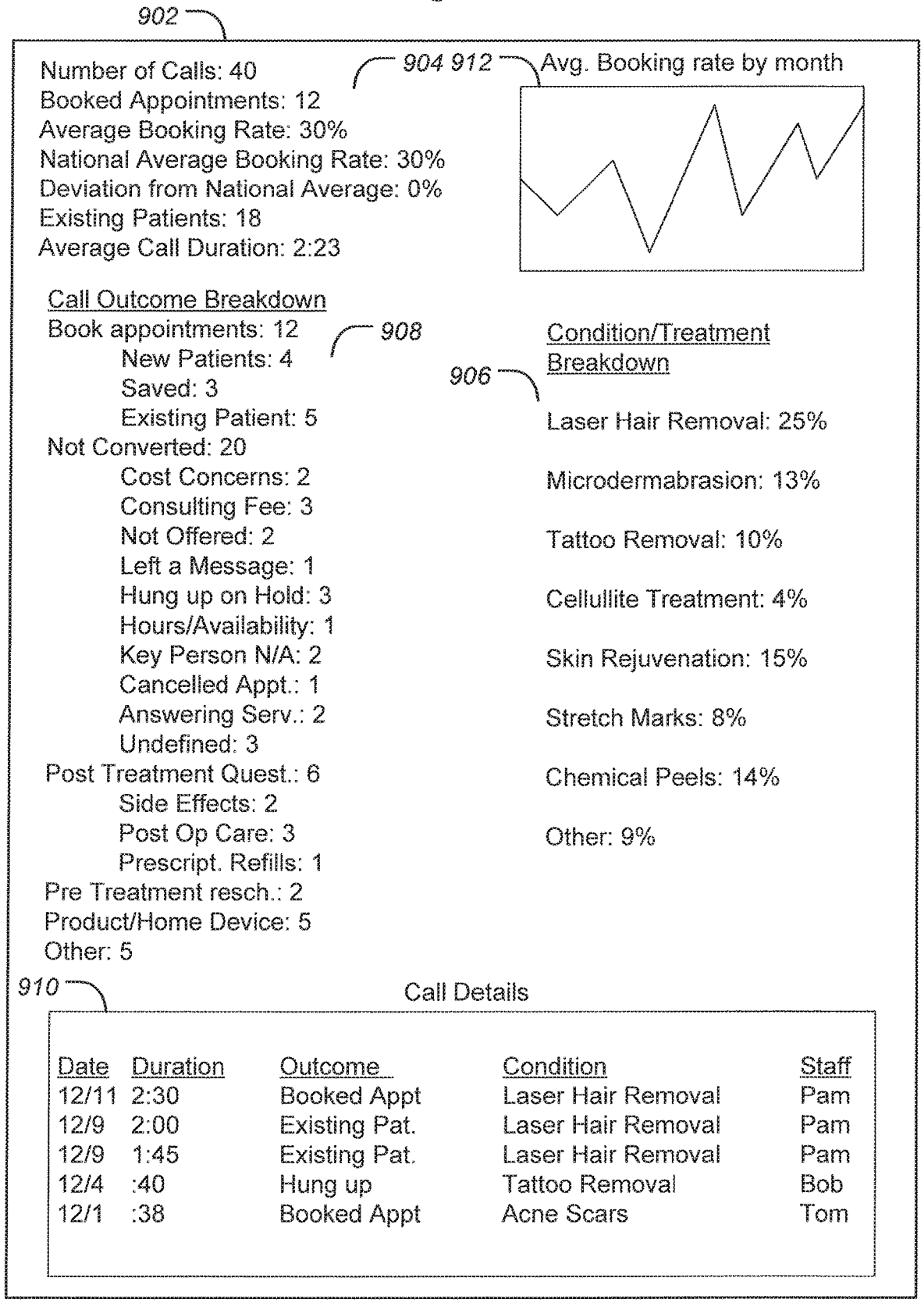
FIG. 9 depicts an exemplary screen shot showing an example of a report generated based on information collected.

FIG. 9 depicts an exemplary screen shot 902 showing an example of a report that may be generated based on information collected from the above-mentioned processes. Users, e.g., doctors, may access this screen by accessing call analysis server 108 over network 112. The assignments of the call outcomes, conditions and categorizations may be used to create the reports. Any variations of this information may be used. Call analysis server 108 may access the call file to retrieve assigned outcomes, conditions, treatments, names and other information for reporting. The screen shot 902 may be accessed by a user accessing call analysis server 108 over network 122. As can be seen from FIG. 9, various useful data may be easily determined through the analysis of the call monitoring process.

For example, through collection of above-mentioned data, call analysis server 108 may determine and display summary information 904 such as the total number of calls that came in, the number of booked appointments, an average booking rate, the national average booking rate, and the deviation from the national average. In addition, it may also display the number of existing patients and the average call duration.

As also shown, the screen shot 902 may also display a breakdown of conditions and treatments 906 about which callers were calling, by percentage, for example. Furthermore, it may display call outcome breakdown 908, showing how many calls booked an appointment, were existing patients, hung up while on hold, left a message, spoke to the answering service or asked for additional information. It may also display call-level details 910 on each individual call, for example, showing the date, duration, call outcome, condition or treatment, and the staff member that answered the call. The reports may also detail statistics for individual staff members. The system may produce these reports in any format, such as a graph of an average booking rate by month 912, and any other additional information may be included.

Figure 10:
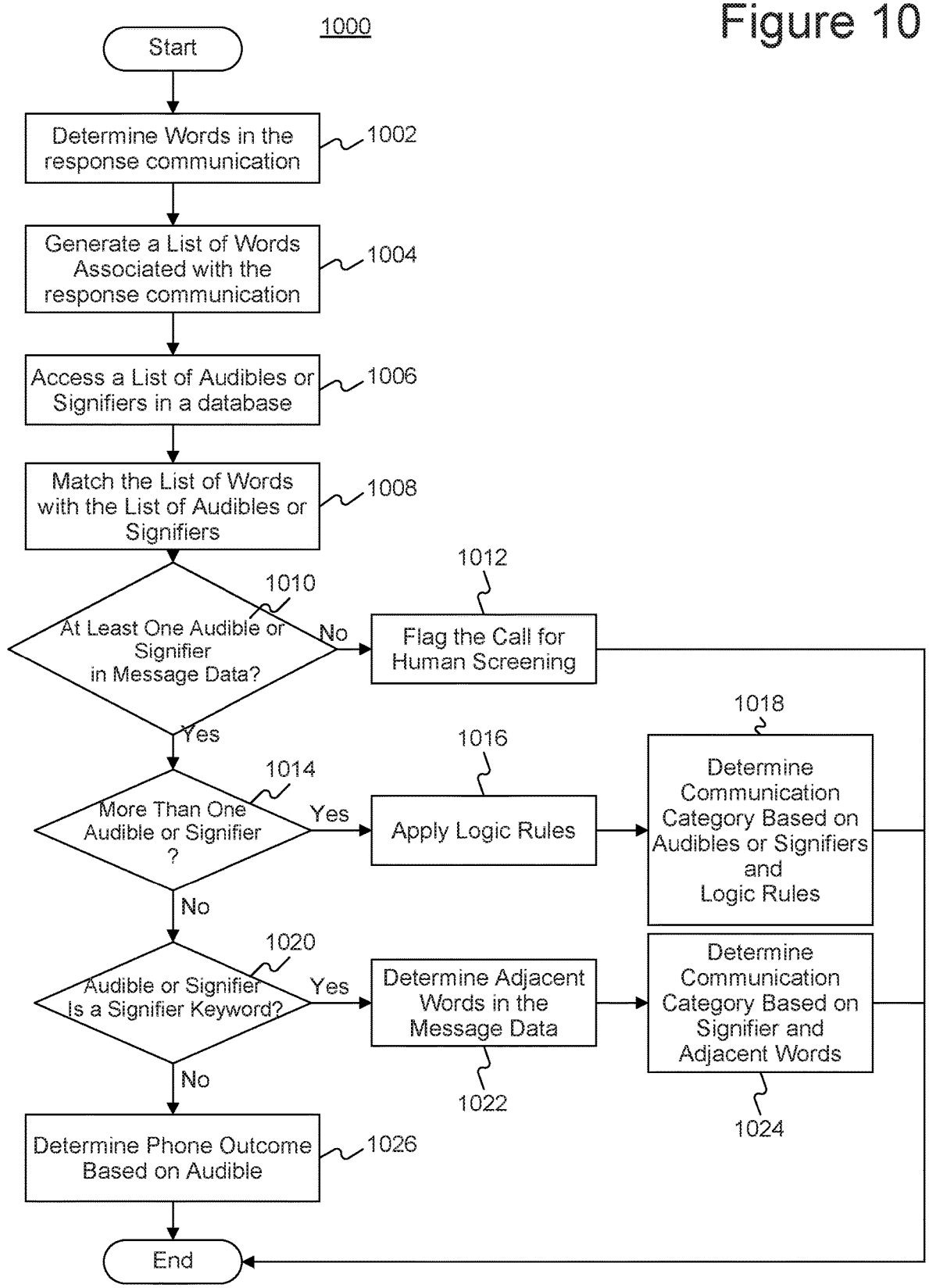
FIG. 10 depicts an exemplary flow chart for determining a phone call outcome based on a response communication, according disclosed embodiments.

FIG. 10 depicts an exemplary flow chart for determining a phone call outcome based on a response communication, according disclosed embodiments. The response communication may have multiple sources. For example, in some embodiments, the response communication may be automatically generated by call analysis server 108 and it may be based on information from the phone call. In other embodiments, the response communication may be generated by an employee in office 106. The determination of the call outcome based on the response communication may lead to more accurate determinations. For example, having standardized vocabulary in the response, and controlled data quality, may facilitate speech recognition used for transcription of data and outcome determinations.

First, the system may determine words in the response communication associated with a phone call (step 1002). For example, the system may determine words in a phone call transcription from voice transcription computer 110. In some embodiments, the system may determine words utilizing parsing processes, like the ones described in step 800, to identify words in an associated text file. In other embodiments, the system may identify words by delimiting a transcription based on characters, such as commas, tabs and/or spaces. In yet other embodiments, the system may utilize speech recognition systems stored in call analysis server 108 and/or accessible through network 112 to identify words.

Additionally, the system may also utilize machine learning techniques and prior communications analyzed by call analysis server 108 to determine or correct words in the response communication in step 1002. The system may employ, for example, a plurality of machine learning techniques such as Hidden Markov models, Dynamic time warping, Neural networks, and/or Deep feedforward neural networks to identify the words in the message. The identified words with these processes, or combinations of processes, may be a single word, groups of words, phrases, and or/sounds.

The system then may proceed to generate a list of words including the determined words in the response communication (step 1004). The list of words may be an array of string variables, character variables, or numeric variables constructed with accumulation functions. The list of words may also have a single dimension or multiple dimensions. The system may access at least one database that stores a list of audibles or signifiers (step 1006).

In some embodiments, audibles and signifiers may be a single or a plurality of words non commonly used in conversation. For example, call analysis server 108 may determine that a response communication that includes the word "Gmax" has an outcome of a sale was made. As another example, call analysis server 108 may determine that a response communication that includes "mammoplasty" has an outcome of an appointment was made. In other embodiments, audibles may be phrases with an associated meaning not evident to caller 102. For example, salutations can vary form "hello," "good morning," "how are you today," "nice to speak to you," "hello my name is." Each one of the salutations variations may be identified by caller analysis server 108 and used to determine the call outcome. Similarly, ending phrases such as "goodbye," "good day," and "talk to you later" may be used to improve the accuracy of the determination performed by call analysis server 108. Even though for caller 102 all the former examples of salutations and goodbyes may have the same meaning, call analysis server 108 may identify different outcomes of the phone call based on the specific salutation. In yet other embodiments, call analysis server 108 may identify sounds such as a clearing of the throat, a cough, or sneeze as an audible or signifier. These sounds may be used to determine the outcome. For example, the clearing of the throat may result in call analysis server 108 an appointment cancellation outcome.

The system may match the list of words with the list of audibles or signifiers, and may identify audibles or signifiers in the message data based on the matching results (step 1008). In some embodiments, the system may sort the list of words and the list of audibles and signifiers and match lists based on their organization. In other embodiments, the system may assign values to characters in each element of the list of words and query the list of audibles and signifiers for identical values to expedite the search. In yet other embodiments the system may match the list of words and the list of audibles and signifiers by grouping elements, for example grouping words by the same initial letter, filtering groups, and matching equivalent elements. The system may execute these processes in call analysis server 108, in a processor accessible through network 112, and/or other available computing device.

As a result of matching between the generated list of words and the list of audibles or signifiers, the system may determine that there are no audibles or signifiers in the message data, and/or no similar elements between the two lists (step 1010: No). Then, the system may proceed to step 1012, in which it may flag the call for human screening in a process similar to the one described in steps 406, 412, and 806. Alternatively, the system may determine that there is at least one audible or signifier in the list of words (step 1010: Yes) and proceed to step 1014, in which the system may determine the number of audibles or signifiers. If at least one audible or signifier is found in the message data, the system may generate a new list of identified audible or signifier that contains the matching elements between the two lists. The system may also modify the list of words to flag the elements that are audible or signifier. Alternatively, or additionally, the system may generate a new list, of the same length to the list words, with Boolean variables indicating if a matching element is in a position of the list of words. If more than one audible or signifier is determined to be in the message data (step 1014: Yes), the system may apply logic rules including, for example, where in the syntax the word appears to govern whether the condition is triggered for the categorization (step 1016). Additionally or alternatively, logic rules may refer to the relevancy strength when applying the logic rules or the interaction between the audible or signifier. In some embodiments, the logic rules may instruct the system to consult a higher raking priority and, for example, select only the audible or signifier with the highest ranking. In other embodiments, the logic rules may be based on Boolean operations between words. For example, AND, OR, NOR, and/or NAND operations may be applied to the group of audibles or signifiers with determined outcomes. After, applying logic rules the system may then proceed to determine an outcome for the phone call based on identified audible or signifier and logic rules.

Words or sounds identified as audibles may have a direct impact in the outcome determination performed by caller analysis server 108. For example, an audible 'have a nice day' may direct the call to an outcome of no appointment being made. As another example, an audible of 'tattoo removal' may direct the call to an outcome of a tattoo removal appointment being made. Additionally, an audible may be an 'erase audible' to indicate that the call should not be classified. For example, in instances where caller 102 dials provisioned phone number for office 104 by mistake, the response communication may include an erase audible to have caller analysis server 108 remove the call from the system. Alternatively, call analysis server 108 may determine the outcome of the phone call as null when at least one erase audible is part of the communication response.

Words or sounds identified as signifiers may not have a direct impact in the outcome determination but may indicate that following or previous words should be used to determine the phone call outcome. For example, signifier 'booked' in sentence 'your tattoo removal was booked' may indicate caller analysis server that previous words (tattoo removal was booked), should be used to determine the outcome of the phone call.

In step 1014, the system may determine also that there is a single audible or signifier in the message data (step 1014: No). The system may determine if the audible or signifier is a signifier keyword. The determination of a signifier keyword may be done by accessing a database which may store a list of signifier keywords, and comparing elements between lists as described in the matching process for step 1008. A signifier keyword may be a word which indicates that adjacent words are going to be relevant to categorize the communication. Then, if a signifier keyword is identified in the response communication the system may proceed to step 1022, in which it may identify adjacent words to the signifier keyword. For example, if the response communication includes a sentence "let me explain the laser procedure," the system may identify "explain" as a signifier keyword, and "laser" and "procedure" as the adjacent words. The system may then continue to step 1024, in which it determines the communication category and/or outcome based on the signifier keyword and the adjacent words.

In step 1020, the system may alternatively determine that the audible or signifier is not a signifier keyword (step 1020:

No). The system may then proceed to step 1026 and determine the category of the communication based on the identified audible.

Figure 11:
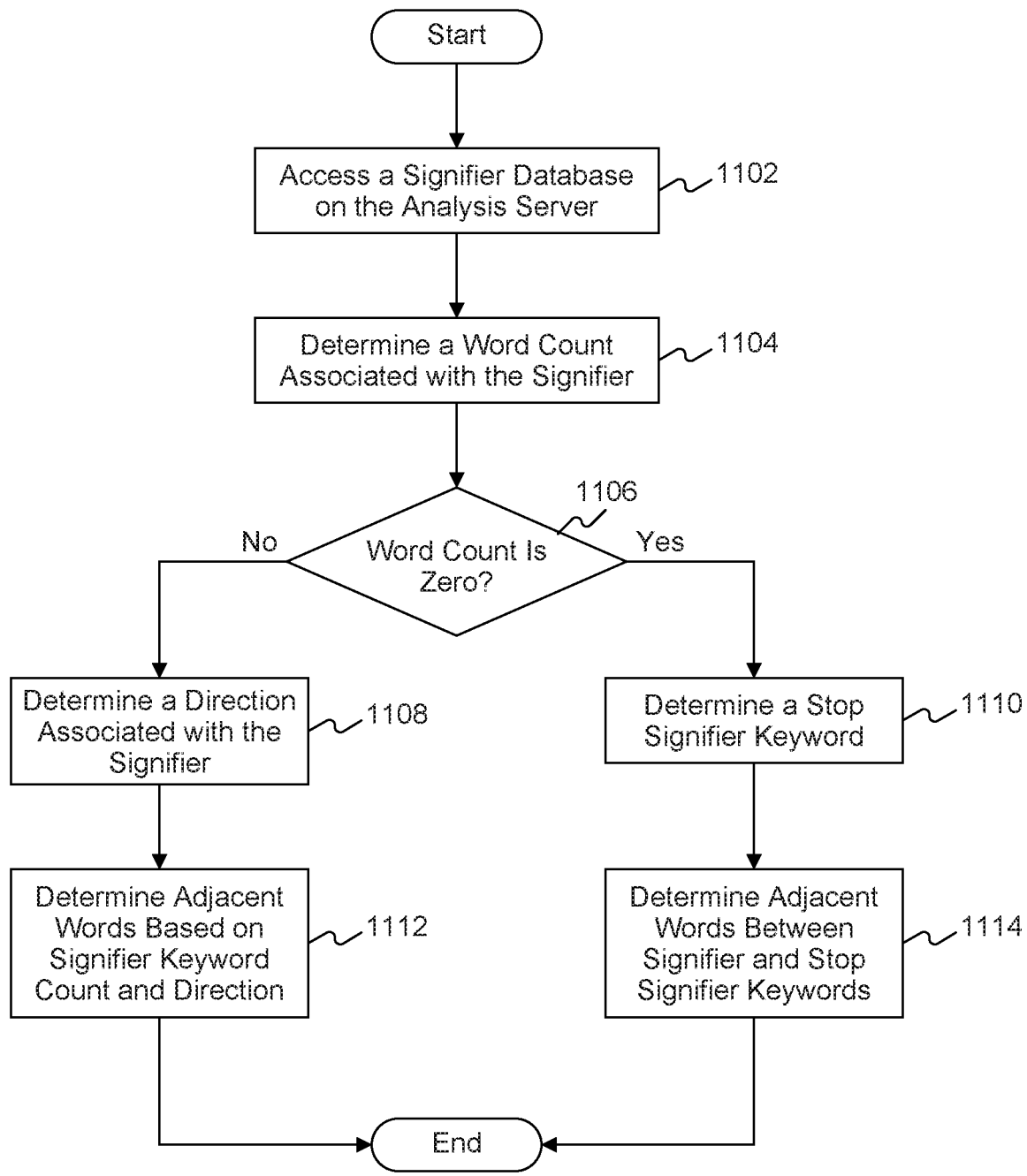
FIG. 11 depicts an exemplary flow chart for determining adjacent words to a signifier keyword, according to disclosed embodiments.

FIG. 11 presents an exemplary flow chart to determine adjacent words when an audible or signifier is determined to be a signifier keyword, further describing step 1022. When the system determines that the audible or signifier is a signifier keyword (step 1020: Yes), it may proceed to step 1102 and access a signifier keyword database. The database may include a plurality of keywords with an associated word count and direction. For example, the database may comprise elements with associated attributes and at least one of those attributes indicate a word count and/or a direction. The system may then proceed to step 1104, in which the system determines the word count and direction for the identified signifier keyword.

The system, may determine the word count associated with the signifier in step 1106. When the associated count is zero (step 1106: Yes), the system may access a database with stop signifier keywords. The system may then match the identified keywords in the message data with a stop signifier keyword (step 1110). The system may then determine that adjacent words are words between signifier and stop signifier keywords. For example, if the message data includes "let me book your appointment for a laser procedure in the agenda," the system may determine that "book" is a signifier keyword. The system may additionally determine that book has a zero word count associated and then determine that "agenda" is a stop signifier keyword. It will then consider "your appointment for a laser procedure in the" as the adjacent words. Alternatively, in step 1106 the system may determine that the word count is not zero (step 1106: No). The system may then determine a direction associated with the signifier keyword (step 1108) and determine the adjacent words based on the word count and direction associated with the signifier keyword. For example, the word "hair" may be determined to be a signifier keyword with a count of 2 and a forward direction. When message data contains "your hair removal appointment has been scheduled for tomorrow," the system may determine that adjacent words are "removal" and "appointment." In a second example, the word "rescheduled" may be determined to be a signifier keyword with a count of three in a reverse direction. When message data contains "we confirm that your waxing has been rescheduled," the system may determine that adjacent words are "waxing," "has," and "been." The system may execute these processes in call analysis server 108, in a processor accessible through network 112, and/or other available computing device.

Examples of phone calls and outcome determination related to cosmetic surgery have been provided in this application. However, disclosed embodiments are consistent with multiple fields and may be utilized in any type of business that communicates with customers.

In some embodiments the phone call, response communication, and outcome may be related to the field of financial services. In such embodiments, caller 102 may request information about, for example, financial products or current loan rates. The response communication may then include audibles or signifiers that result in caller analysis server 108 making an outcome determination related to the financial services field. For example the outcome may include: (1) the caller opened an account, (2) the caller request mortgage information, (3) the caller cancelled an account, (4) the caller made a transaction, (5) the caller made a transfer, (6) the caller made a trade, (7) the caller is closing an account, (8) the caller requested taxes information, (9) the caller cannot login to an online account, (10) the caller is requesting a new credit. Additionally, in such embodiments, the phone call may be received by a financial services office and the caller may be one of a potential customer to the financial service office or a current customer of the financial services office.

Additionally, in embodiments where phone call, response communication, and outcome may be related to the field of financial services, call analysis server 108 may be in communication with additional servers that, for example, may have customer information, may execute orders, or may facilitate a transfer. For example, call analysis server may be in communication with a market clearing server that execute trades or place investments. Caller analysis server 108 may be communicated with such server directly or through network 112. Additionally, in these embodiments voice transcription computer 110 may have encryption mechanisms to communicate with call analysis server 108 and secure sensitive financial information such as social security number or bank account number. Also, in these embodiments call analysis server 108 may connect caller 102 with other office, outside office 106, depending on the outcome of the call. For example, if a call outcome is determined to be "caller will make an investment," call analysis server 108 may connect caller 102 with an investment institution.

In other embodiments the phone call, response communication, and outcome may be related with the field of insurance services. In such embodiments, caller 102 may request information about, for example, insurance products. The response communication may then include audibles or signifiers that result in caller analysis server 108 making an outcome determination related to the insurance services. For example the outcome may include: (1) the caller bought insurance products, such as home, life, auto or renters insurance, (2) the caller made an appointment with an agent, (3) the caller is filing a claim, (4) the caller is switching insurance, (5) the caller requested a quote, or (6) the caller requested a payment plan. Additionally, in such embodiments, the phone call may be received by an insurance office and the caller may be one of a potential customer to the insurance service office or a current customer of the insurance services office.

In other embodiments the phone call, response communication, and outcome may be related to the field of car rentals. In such embodiments, caller 102 may request information about, for example, available cars or current rental rates. The response communication may then include audibles or signifiers that result in caller analysis server 108 making an outcome determination related to car rentals. For example the outcome may include: (1) the caller reserved a car, (2) the caller cancelled a reservation, (3) the caller inquired rates, (4) no vehicles were available in callers requested location, (5) caller requested on-road assistance, (6) caller will be late for his reservation, (7) caller requested a vehicle upgrade, (8) caller requested a vehicle downgrade, (9) caller inquired about insurance. Additionally, in such embodiments, the phone call may be received by a car rental office and the caller may be one of a potential customer to the car rental office or a current customer of the car rental office.

In some embodiments the phone call, response communication, and outcome may be related to the field of tickets retail In such embodiments, caller 102 may request information about, for example, upcoming events or tickets availability to a concert, sporting event or other type of show. The response communication may then include audibles or signifiers that result in caller analysis server 108 making an outcome determination related to the tickets retail field. For example the outcome may include: (1) the caller purchased a ticket, (2) the caller inquired event is sold out, (3) the caller requested event information, (4) the caller asked about venue information, (5) the caller made a group purchase, (6) the caller reserved a suite, (7) the caller is requesting a refund, (8) caller bought premium tickets, (9) the caller inquired ticket packages, (10) the caller bought ticket packages. Additionally, in such embodiments, the phone call may be received by a tickets retail office and the caller may be one of a potential customer to the tickets retail office or a current customer of the tickets retail office.

In some embodiments the phone call, response communication, and outcome may be related to the field of marketing services. In such embodiments, caller 102 may request information about, for example, email marketing or website design. The response communication may then include audibles or signifiers that result in caller analysis server 108 making an outcome determination related to the marketing services field. For example the outcome may include: (1) the caller requested a quote, (2) the caller asked about website design, (3) the caller requested search engine optimization services, (4) the caller requested search engine marketing, (5) the caller requested a non-available service, (6) the caller requested a market research, (7) the caller is planning an event, (8) the caller scheduled an appointment, Additionally, in such embodiments, the phone call may be received by a marketing services office and the caller may be one of a potential customer to the marketing service office or a current customer of the marketing services office.

In some embodiments the phone call, response communication, and outcome may be related to the field of sports industry. In such embodiments, caller 102 may request information about, for example, upcoming games or available merchandise. The response communication may then include audibles or signifiers that result in caller analysis server 108 making an outcome determination related to the tickets retail field. For example the outcome may include: (1) the caller purchased merchandise, (2) the caller inquired asked ticket information, (3) the caller requested an stadium visit, (4) the caller asked about venue information, (5) the caller purchased season tickets, (6) the caller reserved a suite, (7) the caller bought pay per view event. Additionally, in such embodiments, the phone call may be received by a sports industry office and the caller may be one of a potential customer to the sports industry office or a current customer of the sports industry office.

In yet other embodiments the phone call, response communication, and outcome may be related to high volume call centers. In such embodiments, caller 102 may request information about, for example, tickets availability. The response communication may then include audibles or signifiers that result in caller analysis server 108 making an outcome determination related to the operation of a high volume call center. For example the outcome may include: (1) the caller requested general information, (2) the caller was transferred to a specific unit, (3) the caller requested technical support, (4) the caller requested an appointment, (5) the caller made a purchase, (6) the caller has made a reservation. Additionally, in such embodiments, the phone call may be received by a high volume call center and the caller may be one of a potential customer to a service being represented by the high volume call center or a current customer of a service being represented by the high volume call center.

The foregoing description of various embodiments provides illustration and description, but is not intended to be exhaustive or to limit the disclosed embodiments to the precise form disclosed. Modifications and variations are possible in light of the above teachings or may be acquired from practice in accordance with the disclosed embodiments. It is to be understood that the disclosed embodiments are intended to cover various modifications and equivalent arrangements included within the spirit and scope of the appended claims.

What is claimed is:

1. A method in a data processing system for automatically determining an outcome of a phone call, the method comprising:
   receiving voice data of the phone call;
   transmitting a response communication based on the voice data, wherein the response communication includes at least one audible or signifier;
   identifying, by at least one processor, the at least one audible or signifier in the response communication;
   accessing a list of audibles and signifiers stored in a database;
   determining whether there is at least one audible or signifier in the response communication;
   identifying adjacent words in the response communication when the at least one audible or signifier is in the response communication; and
   automatically determining the outcome of the phone call based on the audible or signifier in the response communication.

2. The method of claim 1, wherein the response communication is generated by a call operator.

3. The method of claim 1, wherein the at least one audible or signifier includes at least one word that is not commonly used in conversation.

4. The method of claim 1, wherein the at least one audible or signifier includes a plurality of words.

5. The method of claim 1, wherein identifying the at least one audible or signifier comprises:
   automatically transcribing the response communication into text data;
   generating a list of words based on the text data; and
   associating the list of words and with the list of audibles and signifiers.

6. The method of claim 5 further comprising: assigning the call to a human screener when there is no association between the list of words and with the list of audibles and signifiers.

7. The method of claim 5 further comprising: applying a set of logic rules when more than one audible or signifier are identified.

8. The method of claim 1, wherein identifying adjacent words in the message data comprises: accessing the database; determining a word count associated with the signifier; determining adjacent words based on signifier count and a signifier direction when the signifier count is not zero; and determining adjacent words based on words between the signifier and a stop signifier when the signifier is zero.

9. The method of claim 1, wherein the outcome comprises one of: (1) the caller booked an appointment, and (2) the caller did not book an appointment.

10. The method of claim 1, wherein the outcome comprises one of (1) the caller purchased a product, and (2) the caller did not purchase a product.

11. The method of claim 1 further comprising: automatically determining a condition discussed during the phone call.

12. The method of claim 1 further comprising: automatically determining a service or product associated with the phone call based on the audible or signifier in the response communication.

13. The method of claim 1 further comprising: automatically determining if a caller made a purchase associated based on the audible or signifier in the response communication.

14. The method of claim 1, wherein: the at least one audible or signifier is an erase audible; and the outcome of the phone call is null when at least one audible or signifier is an erase audible.

15. The method of claim 1, wherein the phone call is intended for a financial services office and the caller is one of: (a) a client of the financial services office, and (2) a potential client of the financial services office.

16. The method of claim 15, wherein the phone call outcome comprises one of: (1) the caller opened an account, (2) the caller request mortgage information, (3) the caller cancelled an account, (4) the caller made a transaction, (5) the caller made a transfer, (6) the caller made a trade, (7) the caller is closing an account, (8) the caller requested taxes information, (9) the caller cannot login to an online account, (10) the caller is requesting a new credit.

17. The method of claim 1, wherein the phone call intended for a tickets retail office and the caller is one of: (1) a client of the ticket retail office, and (2) a potential client of the ticket retail office.

18. The method of claim 17, wherein the phone call outcome comprises one of: (1) the caller purchased a ticket, (2) the caller inquired event is sold out, (3) the caller requested event information, (4) the caller asked about venue information, (5) the caller made a group purchase, (6) the caller reserved a suite, (7) the caller is requesting a refund, (8) caller bought premium tickets, (9) the caller inquired ticket packages, (10) the caller bought ticket packages.

19. The method of claim 1, wherein the phone call is intended for a marketing services office and the caller is one of: (1) a client of the marketing services office, and (2) a potential client of the marketing services office.

* * * * *